US011895053B2

(12) United States Patent
Muruganathan et al.

(10) Patent No.: US 11,895,053 B2
(45) Date of Patent: Feb. 6, 2024

(54) CDM8 BASED CSI-RS DESIGNS FOR MIMO

(71) Applicant: Telefonaktiebolaget LM Ericsson (publ), Stockholm (SE)

(72) Inventors: Siva Muruganathan, Stittsville (CA); Shiwei Gao, Nepean (CA); Robert Mark Harrison, Grapevine, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/855,981

(22) Filed: Jul. 1, 2022

(65) Prior Publication Data
US 2022/0407654 A1    Dec. 22, 2022

Related U.S. Application Data

(63) Continuation of application No. 16/352,433, filed on Mar. 13, 2019, now Pat. No. 11,398,887, which is a
(Continued)

(51) Int. Cl.
*H04L 5/00* (2006.01)
*H04W 72/0446* (2023.01)

(52) U.S. Cl.
CPC ....... *H04L 5/0048* (2013.01); *H04W 72/0446* (2013.01)

(58) Field of Classification Search
CPC ... H04L 5/0048; H04L 25/02; H04L 25/0226; H04L 5/0026; H04L 5/0092;
(Continued)

(56) References Cited

U.S. PATENT DOCUMENTS 9,350,476 B2 * 5/2016 Lee .................. H04W 24/08
2009/0252077 A1 * 10/2009 Khandekar .......... H04L 5/0023
370/312
(Continued)

FOREIGN PATENT DOCUMENTS

CN     102474493 A     5/2012
CN     104205660 A    12/2014
(Continued)

OTHER PUBLICATIONS

Extended European Search Report dated Aug. 3, 2022 issued in corresponding European Patent Application No. 22160919.1, consisting of 8 pages.
(Continued)

*Primary Examiner* — Wutchung Chu
(74) *Attorney, Agent, or Firm* — Christopher & Weisberg, P.A.

(57) ABSTRACT

A network node, wireless device, base station, user equipment and corresponding methods are provided. The network node includes processing circuitry configured to: select a first set and second set of reference signal resources in a subframe and aggregate the first set and second set of reference signal resources in the subframe to form a code division multiplexing, CDM, aggregation configuration. The first set and second set of reference signal resources in the subframe satisfy a temporal criterion such that any two resource elements in the first set and second set of reference signal resources have up to a maximum time separation of six OFDM symbols. The first set and second set of reference signal resources in the subframe satisfy a frequency criterion such that any two resource elements in the first set and second set of reference signal resources have up to a maximum frequency separation of six subcarriers.

16 Claims, 22 Drawing Sheets

Related U.S. Application Data continuation of application No. 15/764,062, filed as application No. PCT/IB2017/056048 on Sep. 30, 2017, now Pat. No. 10,931,418.

(60) Provisional application No. 62/403,044, filed on Sep. 30, 2016.

(58) Field of Classification Search
CPC ... H04L 25/0202; H04L 5/005; H04L 5/0016; H04L 5/0023; H04W 72/0446; H04J 11/00; H04B 7/0413
See application file for complete search history.

(56) References Cited

U.S. PATENT DOCUMENTS

| | | | |
|---|---|---|---|
| 2010/0246376 A1 | 9/2010 | Nam et al. | |
| 2011/0176634 A1* | 7/2011 | Yoon | H04L 5/0023 375/267 |
| 2012/0207199 A1* | 8/2012 | Guo | H04L 1/0027 375/308 |
| 2013/0163530 A1* | 6/2013 | Chen | H04L 27/2613 370/329 |
| 2013/0258964 A1* | 10/2013 | Nam | H04B 7/0479 370/329 |
| 2014/0177745 A1* | 6/2014 | Krishnamurthy | H04B 7/063 375/267 |
| 2015/0003269 A1* | 1/2015 | Chun | H04L 5/0053 370/252 |
| 2016/0100407 A1* | 4/2016 | Gaal | H04L 5/0051 370/329 |
| 2017/0141896 A1* | 5/2017 | Yang | H04W 28/04 |
| 2018/0123668 A1* | 5/2018 | Kwak | H04L 5/005 |
| 2018/0270032 A1* | 9/2018 | Li | H04L 5/00 |
| 2018/0278437 A1* | 9/2018 | Davydov | H04B 7/0632 |
| 2019/0090218 A1* | 3/2019 | Noh | H04W 72/23 |
| 2019/0109686 A1* | 4/2019 | Jiang | H04L 5/0053 |
| 2019/0116594 A1* | 4/2019 | Kwak | H04L 5/0096 |
| 2019/0181936 A1* | 6/2019 | Park | H04W 76/27 |
| 2019/0191444 A1* | 6/2019 | Park | H04W 72/23 |
| 2019/0372641 A1* | 12/2019 | Muruganathan | H04W 24/10 |
| 2020/0304258 A1* | 9/2020 | Muruganathan | H04L 5/0057 |
| 2021/0242988 A1* | 8/2021 | Kwak | H04L 27/26 |

FOREIGN PATENT DOCUMENTS

| | | |
|---|---|---|
| CN | 104485984 A | 4/2015 |
| EP | 2 645 616 A2 | 2/2013 |
| JP | 2019-537861 A | 12/2019 |
| RU | 2294599 C2 | 2/2007 |
| WO | 2007124460 A1 | 11/2007 |
| WO | 2010126711 A1 | 11/2010 |

OTHER PUBLICATIONS

International Search Report and Written Opinion of the International Searching Authority dated Jan. 25, 2018 issued in corresponding PCT Application Serial No. PCT/IB2017/056048 consisting of 10 pages.
3GPP TSG-RAN WG1 #86bis, R1-1609843, Source: Ericsson; Lisbon, Portugal, Oct. 10-14, 2016; "CDM-8 for NZP CSI-RS", Agenda Item: 7.2.2.4, Document for Discussion and Decision, consisting of 5 pages.
3GPP TSG-RAN WG1 #83, R1-157204, Source: Ericsson; Anaheim, US, Nov. 16-20, 2015; "CSI-RS Design for Class A FD-MIMO", Agenda Item: 6.2.4.2.1, Document for Discussion and Decision, consisting of 10 pages.
3GPP TSG-RAN WG1 #86, R1-166519, Source: Intel Corporation; Gothenburg, Sweden, Aug. 22-26, 2016; "Performance Comparison of DCM-4 and CDM-8 for CSI-RS", Agenda Item: 7.2.4.1.1, Document for Discussion and Decision, consisting of 4 pages.
3GPP TS 36.211 V13.0.0 3rd Generation Partnership Project; Technical Specification Group Radio Access Network; Evolved Universal Terrestrial Radio Access (E-UTRA); Physical Channels and Modulation (Release 13); Dec. 2015, consisting of 141 pages.
3GPP TS 36.213 V13.0.1 3rd Generation Partnership Project; Technical Specification Group Radio Access Network; Evolved Universal Terrestrial Radio Access (E-UTRA); Physical Layer Procedures (Release 13); Jan. 2016, consisting of 326 pages.
3GPP TSG RAN WG1 Meeting #86, R1-166341, Source: Nokia, Alcatel-Lucent Shanghai Bell; Gothenburg, Sweden, Aug. 22-26, 2016; "Control Signalling for UL DMRS with IFDMA", Agenda Item: 7.2.4.1.3, Document for Discussion and Decision, consisting of 5 pages.
3GPP TSG RAN WG1 Meeting #86, R1-167996, Source: Samsung, Xinwei, Ericsson; Gothenburg, Sweden, Aug. 22-26, 2016; Agenda Item: 7.2.4.1.1, consisting of 4 pages.
3GPP TS 36.331 V13.0.0 3rd Generation Partnership Project; Technical Specification Group Radio Access Network; Evolved Universal Terrestrial Radio Access (E-UTRA); Radio Resource Control (RRC); protocol Specification (Release 13) (Dec. 2015), consisting of 507 pages.
Notification of Transmittal of the International Preliminary Report on Patentability dated Oct. 17, 2018 issued in corresponding PCT Application No. PCT/IB2017/056048, consisting of 34 pages.
Japanese Office Action and English language summary thereof dated Jul. 17, 2020 issued in Japanese Patent Application No. 2019-517797, consisting of 6 pages.
3GPP TSG RANN WG1 Meeting #86; R1-166632; Agenda Item: 7.2.4.1.1; Title: Discussion on CSI-RS with CDM8; Source: NEC; Document for: Discussion and Decision; Gothenburg, Sweden, Aug. 22-26, 2016, consisting of 3 pages.
Indian First Examination Report dated Dec. 29, 2020 issued in corresponding Indian Patent Application No. 201937009398, consisting of 7 pages.
NEC; 3GPP TSG RAN WG1 Meeting #85; R1-164483; Agenda Item: 6.2.3.1.1; Title: Discussion on CSI-RS with CDM8; Document for: Discussion and Decision; Nanjing, China, May 23-27, 2016, consisting of 2 pages.
Mexican Office Action and English translation thereof dated Apr. 7, 2021 issued in corresponding Mexican Application No. MX/a/2019/003466, consisting of 6 pages.
Chinese Office Action with Search Report and English Summary of the Chinese Office Action and English translation of the Chinese Search Report dated Feb. 3, 2021 issued in corresponding Chinese Patent Application No. 201780060767.5, consisting of 10 pages.
NEC; 3GPP TSG RAN WG1 Meeting #86bis; R1-1609150; Agenda Item: 7.2.2.4; Title: Proposals for CSI-RS with CDM8; Document for: Discussion and Decision; Lisbon, Portugal, Oct. 10-14, 2016, consisting of 4 pages.
CATT; 3GPP TSG RAN WG1 Meeting #84bis; R1-162279; Agenda Item: 7.3.3.1.1; Title: CSI_RS Enhancement for {20,24,28,32} Ports; Document for: Discussion and Decision; Busan, S. Korea, Apr. 11-15, 2016, consisting of 3 pages.
ARIPO Office Action dated Jul. 8, 2021 issued in corresponding ARIPO Patent Application No. AP/P/2019/011416, consisting of 4 pages.
Japanese Office Action and English translation of the Japanese Office Action dated Jun. 18, 2021 issued in corresponding Japanese Patent Application No. 2019-517797, consisting of 6 pages.
Russian Office Action and Search Report and English translation of the Russian Office Action and Search Report dated Jan. 24, 2022 issued in Russian Patent Application No. 2019137014, consisting of 11 pages.
Indian Examination Report dated Apr. 19, 2022 issued in Indian Patent Application No. 202138043777, consisting of 6 pages.
3GPP TSG RAN WG1 Meeting #83; R1-157104; Title: Remaining Details of CSI-RS Design for Class A Reporting; Source: ETRI; Agenda Item: 6.2.4.2.1 New CSI-RS Design; Document for: Discussion/Decision; Anaheim, USA, Nov. 16-20, 2015, consisting of 5 pages.
Japanese Office Action and English language summary of the Japanese Office Action dated Oct. 31, 2022 issued in corresponding

(56) References Cited

OTHER PUBLICATIONS

Japanese Patent Application No. 2021-170454, consisting of 4 pages.

* cited by examiner

CDM8 BASED CSI-RS DESIGNS FOR MIMO

CROSS-REFERENCE TO RELATED APPLICATIONS

This application is a continuation of patent application Ser. No. 16/352,433, filed Mar. 13, 2019 and claims priority to U.S. patent application Ser. No. 15/764,062, filed Mar. 28, 2018 (now U.S. patent Ser. No. 10/931,418) entitled "CDM8 BASED CSI-RS DESIGNS FOR MIMO," which claims priority to International Application No.: PCT/IB2017/056048, filed Sep. 30, 2017 entitled "CDM8 BASED CSI-RS DESIGNS FOR MIMO," which claims priority to U.S. Provisional Patent Application No. 62/403,044 filed Sep. 30, 2016 entitled "CDM8 BASED CSI-RS DESIGNS FOR MIMO," the entireties of all of which are incorporated herein by reference.

TECHNICAL FIELD

Wireless communications, and in particular to code division multiplexing, CDM, aggregation configurations for reducing performance losses due to channel variations in wireless communications.

BACKGROUND

Long Term Evolution (LTE) uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval. Further, as shown in FIG. 2, in the time domain, LTE downlink transmissions are organized into radio frames of 10 ms, each radio frame consisting of ten equally-sized subframes of length Tsubframe=1 ms.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. Downlink transmissions are dynamically scheduled, i.e., in each subframe the network node transmits control information about to which terminals data is transmitted and upon which resource blocks the data is transmitted, in the current downlink subframe. This control signaling is typically transmitted in the first 1, 2, 3 or 4 OFDM symbols in each subframe. A downlink system with 3 OFDM symbols as control is illustrated in FIG. 3, which illustrates s downlink subframe.

Codebook-Based Precoding

Multi-antenna techniques can significantly increase the data rates and reliability of a wireless communication system. The performance is particularly improved if both the transmitter and the receiver are equipped with multiple antennas, which results in a multiple-input multiple-output (MIMO) communication channel. Such systems and/or related techniques are commonly referred to as MIMO. The LTE standard is currently evolving with enhanced MIMO support. A core component in LTE is the support of MIMO antenna deployments and MIMO related techniques. Currently, LTE-Advanced supports an 8-layer spatial multiplexing mode for 8 Tx antenna ports with channel dependent precoding. LTE-Advanced Pro adds 8-layer spatial multiplexing support for 2D (2 dimensional)/1D (1 dimensional) port layouts with 8/12/16 Tx antenna ports with channel dependent precoding. In LTE Release 14, support for 8-layer spatial multiplexing for 2D/1D port layouts with 20/24/28/32 Tx antenna ports is being specified. The spatial multiplexing mode is aimed for high data rates in favorable channel conditions. An illustration of the spatial multiplexing operation is provided in FIG. 4, which illustrates a transmission structure of precoded spatial multiplexing mode in LTE.

As seen in FIG. 4, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses OFDM in the downlink (and DFT precoded OFDM in the uplink) and hence the received $N_R \times 1$ vector $y_n$ for a certain TFRE on subcarrier n (or alternatively data TFRE number n) is thus modeled by $$y_n = H_n W s_n + e_n \qquad \text{Equation 1}$$

where $e_n$ is a noise/interference vector. The precoder W can be a wideband precoder, which is constant over frequency, or frequency selective.

The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

The transmission rank, and thus the number of spatially multiplexed layers, is reflected in the number of columns of the precoder. For efficient performance, it is important that a transmission rank that matches the channel properties is selected.

2D Antenna Arrays

Developments in Third Generation Partnership Project (3GPP) has led to the discussion of two-dimensional antenna arrays where each antenna element has an independent phase and amplitude control, thereby enabling beamforming in both in the vertical and the horizontal dimensions. Such antenna arrays may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antenna elements is thus $N=N_h N_v N_p$. An example of an antenna where $N_h=8$ and $N_v=4$ is illustrated in FIG. 5 below. It furthermore consists of cross-polarized antenna elements meaning that $N_p=2$. We will denote such an antenna as an 8×4 antenna array with cross-polarized antenna elements.

However, from a standardization perspective, the actual number of elements in the antenna array is not visible to the wireless device, but rather the antenna ports, where each port corresponds to a CSI (channel state information) reference signal described further below. The wireless device can thus measure the channel from each of these ports. Therefore, a 2D port layout is introduced, described by the number of antenna ports in the horizontal dimension $M_h$, the number of antenna rows corresponding to the vertical dimension $M_v$ and the number of dimensions corresponding to different polarizations $M_p$. The total number of antenna ports is thus $M=M_h M_v M_p$. The mapping of these ports on to the N antenna elements is an eNB implementation issue and thus not visible to the wireless device. The wireless device does not even know the value of N; it only knows the value of the number of ports M.

For LTE Rel-12 wireless device and earlier, only a codebook feedback for a 1D port layout is supported, with 2,4 or 8 antenna ports. Hence, the codebook is designed assuming these ports are arranged on a straight line. In LTE Rel-13, codebooks for 2D port layouts were specified for the case of 8, 12, or 16 antenna ports. In addition, a codebook 1D port layout for the case of 16 antenna ports was also specified in LTE Rel-13. The specified Rel-13 codebooks for the 2D port layouts can be interpreted as a combination of precoders tailored for a horizontal array and a vertical array of antenna ports. This means that (at least part of) the precoder can be described as a function of $$v_{l,m} = \left[ u_m \quad e^{j\frac{2\pi l}{O_1 N_1}} u_m \quad \ldots \quad e^{j\frac{2\pi l(N_1-1)}{O_1 N_1}} u_m \right]^T \quad \text{Equation 2}$$

wherein $$u_m = \left[ 1 \quad e^{j\frac{2\pi m}{O_2 N_2}} \quad \ldots \quad e^{j\frac{2\pi m(N_2-1)}{O_2 N_2}} \right] \quad \text{Equation 3}$$

In Equation 2-Equation 3, the parameters $N_1$ and $N_2$ denote the number of ports in the $1^{st}$ dimension and the $2^{nd}$ dimension, respectively. For 1D port layouts, $N_2=1$ and $u_m$ in equation 3 becomes 1. It should be noted that the $1^{st}$ dimension could either be the horizontal dimension or the vertical dimension and the $2^{nd}$ dimension would represent the other dimension. In other words, using the notation of FIG. 5, two possibilities: (1) $N_1=M_h$ and $N_2=M_v$, (2) $N_1=M_v$ and $N_2=M_h$ could exist, where FIG. 5 illustrates a two-dimensional antenna array of cross-polarized antenna elements ($N_p=2$), with $N_h=4$ horizontal antenna elements and $N_v=8$ vertical antenna elements, and in the right hand side of FIG. 5, the actual port layout with 2 vertical ports and 4 horizontal ports. This could for instance be obtained by virtualizing each port by 4 vertical antenna elements. Hence, assuming cross-polarized ports are present, the wireless device will measure 16 antenna ports in this example.

The $O_1$ and $O_2$ parameters in Equation 2-Equation 3 represent the beam spatial oversampling factors in dimensions 1 and 2, respectively. The values of $N_1$, $N_2$, $O_1$ and $O_2$ are configured by radio resource control (RRC) signaling. The supported configurations of $(O_1,O_2)$ and $(N_1,N_2)$ for a given number of CSI-RS ports are given in Table 7.2.4-17 of 3GPP TS 36.213 Technical Specification Group Radio Access Network, Evolved Universal Terrestrial Radio Access (E-UTRA); Physical layer procedures (Release 13); V13.0.1 (2016 January), which is reproduced below in Table 1.

| Number of CSI-RS antenna ports | $(N_1, N_2)$ | $(O_1, O_2)$ |
|---|---|---|
| 8 | (2, 2) | (4, 4), (8, 8) |
| 12 | (2, 3) | (8, 4), (8, 8) |
|  | (3, 2) | (8, 4), (4, 4) |
| 16 | (2, 4) | (8, 4), (8, 8) |
|  | (4, 2) | (8, 4), (4, 4) |
|  | (8, 1) | (4, -), (8, -) |

Table 1. Supported configurations of $(O_1,O_2)$ and $(N_1,N_2)$ Table 7.2.4-17 of 3GPP TS 36.213 Technical Specification Group Radio Access Network; Evolved Universal Terrestrial Radio Access (E-UTRA); Physical layer procedures (Release 13); V13.0.1 (2016 January).

The details of the LTE Rel-13 codebooks defined using the quantity in Equation 2 can be found in Tables 7.2.4-10, 7.2.4-11, 7.2.4-12, 7.2.4-13, 7.2.4-14, 7.2.4-15, 7.2.4-16, and 7.2.4-17 of 3GPP TS 36.213.

Non-Zero Power Channel State Information Reference Symbols (NZP CSI-RS)

In LTE Release-10, a new reference symbol sequence was introduced for the intent to estimate channel state information, the NZP CSI-RS. The NZP CSI-RS provides several advantages over basing the CSI feedback on the cell-specific reference symbols (CRS) which were used, for that purpose, in previous releases. Firstly, the NZP CSI-RS is not used for demodulation of the data signal, and thus does not require the same density (i.e., the overhead of the NZP CSI-RS is substantially less). Secondly, NZP CSI-RS provides a much more flexible means to configure CSI feedback measurements (e.g., which NZP CSI-RS resource to measure on can be configured in a wireless device specific manner).

By measuring on a NZP CSI-RS, a wireless device can estimate the effective channel the NZP CSI-RS is traversing including the radio propagation channel and antenna gains. In more mathematical rigor this implies that if a known NZP CSI-RS signal x is transmitted, a wireless device can estimate the coupling between the transmitted signal and the received signal (i.e., the effective channel). Hence if no virtualization is performed in the transmission, the received signal y can be expressed as $$y=Hx+e \quad \text{Equation 4}$$

and the wireless device can estimate the effective channel H. Up to eight NZP CSI-RS ports can be configured for a LTE Rel.11 wireless device, that is, the wireless device can thus estimate the channel from up to eight transmit antenna ports in LTE Rel-11.

Up to LTE Rel-12, the NZP CSI-RS utilizes an orthogonal cover code (OCC) of length two to overlay two antenna ports on two consecutive REs. A length-2 OCC can be realized by the pair of orthogonal codes [1 1] and [1 −1]. Throughout this document, OCC is alternatively referred to as code division multiplexing (CDM). A length-N OCC may be either referred to as OCC-N or as CDM-N where N can take on values of 2, 4, or 8.

As seen in FIG. 6, many different NZP CSI-RS patterns are available, in which FIG. 6 illustrates resource element grid over an RB pair showing potential positions for UE specific RS (distinguished by respective hatching(s)), CSI-RS (marked with a number corresponding to the CSI-RS antenna port), and CRS (distinguished by respective hatching(s)) as is well known in the art. For the case of 2 CSI-RS antenna ports, there are 20 different patterns within a subframe. The corresponding number of patterns is 10 and 5 for 4 and 8 CSI-RS antenna ports, respectively. For Time Division Duplex (TDD), some additional CSI-RS patterns are available.

The reference-signal sequence for CSI-RS is defined in Section 6.10.5.1 of 3GPP TS 36.211 Technical Specification Group Radio Access Network; Evolved Universal Terrestrial Radio Access (E-UTRA); Physical channels and modulation (Release 13); V13.0.0 (2015 December) as $$r_{l,n_s}(m) = \frac{1}{\sqrt{2}}(1 - 2 \cdot c(2m)) + j\frac{1}{\sqrt{2}}(1 - 2 \cdot c(2m+1)),$$ Equation 5

$$m = 0, 1, \ldots, N_{RB}^{max,DL} - 1$$

where $n_s$ is the slot number within a radio frame and l is the OFDM symbol number within the slot. The pseudo-random sequence c(i) is generated and initialized according to Sections 7.2 and 6.10.5.1 of [2] 3GPP TS 36.211 Technical Specification Group Radio Access Network; Evolved Universal Terrestrial Radio Access (E-UTRA); Physical channels and modulation (Release 13); V13.0.0 (2015 December), respectively. Furthermore, in Equation 5, $N_{RB}^{max,DL}$=110 RB is the largest downlink bandwidth configuration supported by specification 3GPP TS 36.211 Technical Specification Group Radio Access Network, Evolved Universal Terrestrial Radio Access (E-UTRA); Physical channels and modulation (Release 13); V13.0.0 (2015 December).

In LTE Rel-13, the NZP CSI-RS resource is extended to include 12 and 16 ports. Such Rel-13 NZP CSI-RS resource is obtained by aggregating three legacy 4 port CSI-RS resources (to form a 12 port NZP CSI-RS resource) or two legacy 8 port CSI-RS resources (to form a 16 port NZP CSI-RS resource). It should be noted that all NZP CSI-RS resource aggregated together are located in the same subframe. Examples of forming 12 port and 16 port NZP CSI-RS resources are shown in FIGS. 7A and 7B, in which FIG. 7A illustrates an example of aggregating three 4-port resources to form a 12-port NZP CSI-RS Resource; and FIG. 7B illustrates an example of aggregating two 8-port resources to form a 16-port NZP CSI-RS Resource, each 4-port resource and 8-port being aggregated together is labeled with the same number. In a given subframe, it is possible to have three 12-port resource configurations (i.e., nine out of ten 4-port resources used) and two 16-port resource configurations (i.e., four out of five 8-port resources used). The following port numbering is used for the aggregated NZP CSI-RS resources:

The aggregated port numbers are 15, 16, 17, 18, 19, 20, 21, 22, 23, 24, 25, 26, 27, 28, 29, 30 (for 16 NZP CSI-RS ports);

The aggregated port numbers are 15, 16, 17, 18, 19, 20, 21, 22, 23, 24, 25, 26 (for 12 NZP CSI-RS ports).

In addition, Rel-13 NZP CSI-RS design supports two different OCC lengths. It is possible to multiplex antenna ports using OCC lengths two and four for both 12-port and 16-port NZP CSI-RS.

NZP CSI-RS Designs with OCC Length 2

FIG. 8 shows the NZP CSI-RS design for the case of 12 ports with OCC length 2, where different 4-port resources are denoted by the alphabets A-J. In FIG. 8, the different 4-port NZP CSI-RS resources are denoted by the alphabets A-J. For instance, 4-port resources A, F, and J could be aggregated to form a 12-port NZP CSI-RS resource. The length 2 OCC is applied across two REs with the same sub-carrier index and adjacent OFDM symbol indices (for instance, OCC 2 is applied to the REs with OFDM symbol indices 5-6 and sub-carrier index 9 in slot 0).

FIG. 9 shows the NZP CSI-RS design for the case of 16 ports with OCC length 2, where the different 8 port resources are shown in the legend of FIG. 9, and the resources elements with the same alphabet form one CDM group within each 8 port resource. In FIG. 9, the different 8-port NZP CSI-RS resources are shown in the legend. For instance, 8-port NZP CSI-RS resources 1 and 3 could be aggregated to form a 16-port NZP CSI-RS resource. The length 2 OCC is applied across two REs with the same sub-carrier index and adjacent OFDM symbol indices (for instance, OCC 2 is applied to the REs with OFDM symbol indices 2-3 and sub-carrier index 7 in slot 1).

For the OCC length 2 case (i.e., when higher layer parameter 'cdmType' is set to cdm2 or when 'cdmType' is not configured by Evolved UMTS Terrestrial Radio Access Network (EUTRAN)), the mapping of the reference signal sequence $r_{l,n_s}(m)$ of Equation 5 to the complex-valued modulation symbols $a_{k,l}^{(p)}$ used as reference symbols on antenna port p is defined as:

$$a_{k,l}^{(p')} = w_{l''} \cdot r_{l,n_s}(m')$$ Equation 6 where

Equation 7

$$k =$$

$$k' + 12m + \begin{cases} -0 \text{ for } p' \in \{15, 16\}, \text{ normal cyclic prefix} \\ -6 \text{ for } p' \in \{17, 18\}, \text{ normal cyclic prefix} \\ -1 \text{ for } p' \in \{19, 20\}, \text{ normal cyclic prefix} \\ -7 \text{ for } p' \in \{21, 22\}, \text{ normal cyclic prefix} \\ -0 \text{ for } p' \in \{15, 16\}, \text{ extended cylic prefix} \\ -3 \text{ for } p' \in \{17, 18\}, \text{ extended cylic prefix} \\ -6 \text{ for } p' \in \{19, 20\}, \text{ extended cylic prefix} \\ -9 \text{ for } p' \in \{21, 22\}, \text{ extended cylic prefix} \end{cases}$$

$$l = l' + $$

$$\begin{cases} l'' & \text{CSI reference signal configurations } 0-19, \text{ normal cyclic prefix} \\ 2l'' & \text{CSI reference signal configurations } 20-31, \text{ normal cyclic prefix} \\ l'' & \text{CSI reference signal configurations } 0-27, \text{ normal cyclic prefix} \end{cases}$$

$$w_{l''} = \begin{cases} 1 & p' \in \{15, 17, 19, 21\} \\ (-1)^{l''} & p' \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 6-Equation 7, $N_{RB}^{DL}$ represents the downlink transmission bandwidth; the indices k' and l' indicate the subcarrier index (starting from the bottom of each RB) and the OFDM symbol index (starting from the right of each slot). The mapping of different (k', l') pairs to different CSI-RS resource configurations is given in Table 2.

TABLE 2

Mapping from CSI reference signal configuration to $(k', l')$ for normal cyclic prefix

| CSI-RS config. | 1 or 2 | | | | 4 | | | | 8 | | | |
|---|---|---|---|---|---|---|---|---|---|---|---|---|
| | Normal subframe | | Special subframe | | Normal subframe | | Special subframe | | Normal subframe | | Special subframe | |
| | (k', l') | $n_s'$ | (k', l') | $n_s'$ | (k', l') | $n_s'$ | (k', l') | $n_s'$ | (k', l') | $n_s'$ | (k', l') | $n_s'$ |
| 0 | (9, 5) | 0 | (9, 5) | 0 | (9, 5) | 0 | (9, 5) | 0 | (9, 5) | 0 | (9, 5) | 0 |
| 1 | (11, 2) | 1 | (11, 5) | 0 | (11, 2) | 1 | (11, 5) | 0 | (11, 2) | 1 | (11, 5) | 0 |
| 2 | (9, 2) | 1 | (9, 2) | 1 | (9, 2) | 1 | (9, 2) | 1 | (9, 2) | 1 | (9, 2) | 1 |
| 3 | (7, 2) | 1 | (7, 5) | 0 | (7, 2) | 1 | (7, 5) | 0 | (7, 2) | 1 | (7, 5) | 0 |
| 4 | (9, 5) | 1 | | | (9, 5) | 1 | | | (9, 5) | 1 | | |
| 5 | (8, 5) | 0 | (8, 5) | 0 | (8, 5) | 0 | (8, 5) | 0 | | | | |
| 6 | (10, 2) | 1 | (10, 5) | 0 | (10, 2) | 1 | (10, 5) | 0 | | | | |
| 7 | (8, 2) | 1 | (8, 2) | 1 | (8, 2) | 1 | (8, 2) | 1 | | | | |
| 8 | (6, 2) | 1 | (6, 5) | 0 | (6, 2) | 1 | (6, 5) | 0 | | | | |
| 9 | (8, 5) | 1 | | | (8, 5) | 1 | | | | | | |
| 10 | (3, 5) | 0 | (3, 5) | 0 | | | | | | | | |
| 11 | (2, 5) | 0 | (2, 5) | 0 | | | | | | | | |
| 12 | (5, 2) | 1 | (5, 5) | 0 | | | | | | | | |
| 13 | (4, 2) | 1 | (4, 5) | 0 | | | | | | | | |
| 14 | (3, 2) | 1 | (3, 2) | 1 | | | | | | | | |
| 15 | (2, 2) | 1 | (2, 2) | 1 | | | | | | | | |
| 16 | (1, 2) | 1 | (1, 5) | 0 | | | | | | | | |
| 17 | (0, 2) | 1 | (0, 5) | 0 | | | | | | | | |
| 18 | (3, 5) | 1 | | | | | | | | | | |
| 19 | (2, 5) | 1 | | | | | | | | | | |
| 20 | (11, 1) | 1 | | | (11, 1) | 1 | | | (11, 1) | 1 | | |
| 21 | (9, 1) | 1 | | | (9, 1) | 1 | | | (9, 1) | 1 | | |
| 22 | (7, 1) | 1 | | | (7, 1) | 1 | | | (7, 1) | 1 | | |
| 23 | (10, 1) | 1 | | | (10, 1) | 1 | | | | | | |
| 24 | (8, 1) | 1 | | | (8, 1) | 1 | | | | | | |
| 25 | (6, 1) | 1 | | | (6, 1) | 1 | | | | | | |
| 26 | (5, 1) | 1 | | | | | | | | | | |
| 27 | (4, 1) | 1 | | | | | | | | | | |
| 28 | (3, 1) | 1 | | | | | | | | | | |
| 29 | (2, 1) | 1 | | | | | | | | | | |
| 30 | (1, 1) | 1 | | | | | | | | | | |
| 31 | (0, 1) | 1 | | | | | | | | | | |

The quantity p' for the case of OCC length 2 is related to the antenna port number p as follows:
p=p' for CSI-RS using up to 8 antenna ports;
when higher-layer parameter 'cdmType' is set to cdm2 for CSI-RS using more than 8 antenna ports, the following:

$$p = \begin{cases} p' + \frac{N_{ports}^{CSI}}{2} i & \text{for } p' \in \{15, \ldots, 15 + N_{ports}^{CSI}/2 - 1\} \\ p' + \frac{N_{ports}^{CSI}}{2} (i + N_{res}^{CSI} - 1) & \text{for } p' \in \{15 + N_{ports}^{CSI}/2, \ldots, 15 + N_{ports}^{CSI} - 1\} \end{cases} \quad \text{Equation 8}$$

wherein $i \in \{0, 1, \ldots, N_{res}^{CSI}-1\}$ is the CSI resource number; $N_{res}^{CSI}$ and $N_{ports}^{CSI}$ respectively denote the number of aggregated CSI-RS resources and the number of antenna ports per aggregated CSI-RS resource. As stated above, the allowed values of $N_{res}^{CSI}$ and $N_{ports}^{CSI}$ for the cases of 12 and 16 port NZP CSI-RS design are given in Table 3.

| Total number of antenna ports $N_{res}^{CSI} N_{ports}^{CSI}$ | Number of antenna ports per resources $N_{ports}^{CSI}$ | Number of CSI-RS resources $N_{res}^{CSI}$ |
|---|---|---|
| 12 | 4 | 3 |
| 16 | 8 | 2 |

NZP CSI-RS Designs with OCC Length 4

FIG. 10 shows the NZP CSI-RS design for the case of 12 ports with OCC length 4, where 4-port resources are denoted by the alphabets A-J. In FIG. 10, the different 4-port NZP CSI-RS resources are denoted by the alphabets A-J. For instance, 4-port resources A, F, and J could be aggregated to form a 12-port NZP CSI-RS resource. A length 4 OCC is applied within a CDM group where a CDM group consists of the 4 resource elements used for mapping legacy 4-port CSI-RS. That is, the resource elements labeled with the same alphabet in FIG. 10 comprise one CDM group. A length-4 OCC is given in Equation 9.

$$W_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{Equation 9}$$

FIG. 11 shows the NZP CSI-RS design for the case of 16 ports with OCC length 4, where different 8-port resources are shown in the legend, the resource elements with the same alphabet form one CDM group within an 8-port CSI-RS resource. In FIG. 11, the different 8-port NZP CSI-RS resources are shown in the legend. For instance, 8-port NZP CSI-RS resources 1 and 3 could be aggregated to form a 16-port NZP CSI-RS resource. Each 8-port resource is further partitioned into two groups of 4 adjacent REs and each of these groups comprises a CDM group. In FIG. 11, the REs with labels A and B form one legacy 8-port resource where A and B are the CDM groups within this resource. An OCC with length 4 is applied within each CDM group. In the rest of the document, the CDM groups corresponding to REs with labels A and B within each 8-port NZP CSI-RS resource configuration are referred to as CDM groups i and ii, respectively.

For the OCC length 4 case (i.e., when higher layer parameter 'cdmType' is set to cdm4), the mapping of the reference signal sequence $r_{l,n_s}(m)$ of Equation 5 to the complex-valued modulation symbols $a_{k,l}^{(p)}$ used as reference symbols on antenna port p are defined as:

$$a_{k,l}^{(p')} = w_{p'}(i) \cdot r_{l,n_s}(m')$$ Equation 10 where $$k = k' + 12m - \begin{cases} k'' & \text{for } p' \in \{15, 16, 19, 20\}, \\ & \text{normal cyclic prefix, } N_{ports}^{CSI} = 8 \\ k'' + 6 & \text{for } p' \in \{17, 18, 21, 22\}, \\ & \text{normal cyclic prefix, } N_{ports}^{CSI} = 8 \\ 6k'' & \text{for } p' \in \{15, 16, 17, 18\}, \\ & \text{normal cyclic prefix, } N_{ports}^{CSI} = 4 \end{cases}$$ Equation 11

$$l = l' + \begin{cases} l'' & \text{CSI reference signal configurations } 0 - 19, \\ & \text{normal cyclic prefix} \\ 2l'' & \text{CSI reference signal configurations } 20 - 31, \\ & \text{normal cyclic prefix} \end{cases}$$

$$l'' = 0, 1$$

$$k'' = 0, 1$$

$$i = 2k'' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 10-Equation 11, $N_{RB}^{DL}$ represents the downlink transmission bandwidth; $N_{ports}^{CSI}$ denotes the number of antenna ports per aggregated CSI-RS resource; the indices k' and l' indicate the subcarrier index (starting from the bottom of each RB) and the OFDM symbol index (starting from the right of each slot). The mapping of different (k', l') pairs to different CSI-RS resource configurations is given in Table 2. Furthermore, $w_{p'}(i)$ in Equation 10 is given by Table 4, where Table 4 illustrates the sequence $w_{p'}(i)$ for CDM4.

| p' | | |
|---|---|---|
| $N_{ports}^{CSI} = 4$ | $N_{ports}^{CSI} = 8$ | $[w_{p'}(0)\ w_{p'}(1)\ w_{p'}(2)\ w_{p'}(3)]$ |
| 15 | 15, 17 | [1 1 1 1] |
| 16 | 16, 18 | [1 −1 1 −1] |
| 17 | 19, 21 | [1 1 −1 −1] |
| 18 | 20, 22 | [1 −1 −1 1] |

When higher-layer parameter 'cdmType' is set to cdm4 for CSI-RS using more than 8 antenna ports, antenna port number $$p = iN_{ports}^{CSI} + p'$$ Equation 12 where $p' \in \{15, 16, \ldots, 15+N_{ports}^{CSI}-1\}$ for CSI-RS resource number $i \in \{0, 1, \ldots, N_{res}^{CSI}-1\}$.

SUMMARY

Some embodiments advantageously provide a method and system for code division multiplexing, CDM, aggregation configurations for reducing performance losses due to channel variations in wireless communications.

Disadvantages of one approach in CDM-8 design include that (1) it will suffer performance losses if the channel varies significantly over 9 OFDM symbols due to loss of orthogonality in the CDM-8 group, and (2) it has higher CSI-RS overhead than required. Other disadvantages of other CDM-8 approaches include (1) the scheme does not prevent performance losses if the channel varies significantly over 9 OFDM symbols due to loss of orthogonality in the CDM-8 group, and (2) the scheme is not suitable for 24 ports. For 24-ports, if CDM-4 aggregation is done arbitrarily (as discussed above) to form a CDM-8 group, this can still result in performance losses if the channel varies significantly over 9 OFDM symbols due to loss of orthogonality in the CDM-8 group as illustrated in the example of FIG. 15.

Certain aspects and their embodiments of the present disclosure may provide solutions to these or other problems. In a first solution, the length 8 orthogonal cover code is achieved by aggregating two length 4 orthogonal cover code groups belonging to a pair of legacy LTE CSI-RS resources where the pair of legacy resources are chosen from a constrained set of pairs that are chosen to minimize loss of orthogonality of the length 8 cover code due to channel variations in time domain. In this solution, the network node signals to the wireless device pairs of legacy CSI-RS resources that are selected during the aggregation of length 4 orthogonal cover code groups or indices that represent pairs of legacy CSI-RS resources that are selected during the aggregation of length 4 orthogonal cover code groups.

In a second solution, the length 8 orthogonal cover code is achieved by aggregating two length 4 orthogonal cover code groups belonging to a pair of legacy LTE CSI-RS resources where the pair of legacy resources and which length 4 orthogonal cover code groups are selected from a constrained set of pairs that are chosen to minimize loss of orthogonality of the length 8 cover code due to channel variations in time and frequency domains. In this solution, where the network node signals to the wireless device one or more 8-port CSI-RS configuration and CDM-4 group combination pairs that are chosen during the aggregation of length 4 orthogonal cover code groups or one or more indices that represent 8-port CSI-RS configuration and CDM-4 group combination pairs that are chosen during the aggregation of length 4 orthogonal cover code groups.

In one embodiment of the disclosure, a method of increasing the energy in a reference signal while limiting its bandwidth, the method comprising at least one of:
a) Selecting a first and a second reference signal configuration, where at least one of the following are met:
  i) the first and the second reference signal configurations are selected from a predefined set of reference signal configurations
  ii) each reference signal configuration identifies a set of frequency and time locations of resource elements
  iii) each resource element is associated with an element of a reference sequence
  iv) a maximum time separation of the time locations in the first and second reference signal configurations is a first maximum separation
  v) the largest maximum time separation of the time locations over all possible pairs of reference signal configurations in the predefined set is a largest maximum separation, and
  vi) the largest maximum time separation is greater than the first maximum separation;

b) forming a reference signal by applying a first cover sequence to a first and a second set of reference signal sequences, where at least one of the following are met:
  i) the first reference signal sequence corresponds to a first subset of reference elements of the first reference signal configuration
  ii) the second reference signal sequence corresponds to a second subset of reference elements of the second reference signal configuration
  iii) the first cover sequence is associated with an antenna port,
  iv) the first cover sequence is selected from a set of cover sequences,
  v) and each cover sequence is orthogonal to every other cover sequence in the set; and
c) transmitting the reference signal in the first and second subsets of reference elements.

According to one aspect of this embodiment, at least one of the following are met: a maximum frequency separation of the frequency locations in the first and second subsets is a second maximum separation, the largest maximum frequency separation of the frequency locations over all possible pairs of reference elements in the first and second reference signal configurations is a largest maximum separation and the largest maximum frequency separation is greater than the second maximum separation.

According to one aspect of this embodiment,
d) Transmitting N distinct reference signals in the first and second subsets of resource elements, wherein at least one of the following are met:
  i) each reference signal is associated with an antenna port number, thereby creating a set of antenna port numbers for the N distinct reference signals
  ii) the antenna port numbers are consecutive, such that any antenna port number in the set $n_1$ is related to another antenna port $n_2$ in the set according to: $n_1 = n_2 + 1$ or $n_1 = n_2 - 1$.

According to another embodiment of the disclosure, a method of transmitting CSI-RS ports in multiple aggregated legacy LTE CSI-RS resources using a length 8 orthogonal cover code. According to one or more embodiments of the disclosure, the length 8 orthogonal cover code is achieved by aggregating two length 4 orthogonal cover code groups belonging to a pair of legacy LTE CSI-RS resources where the pair of legacy resources are chosen from a constrained set of pairs that are chosen to minimize loss of orthogonality of the length 8 cover code due to channel variations in time domain. According to one aspect of this embodiment, a network node signals to a wireless device the pairs of legacy CSI-RS resources that are chosen during the aggregation of length 4 orthogonal cover code groups or one or more indices that represent the pairs of legacy CSI-RS resources that are chosen during the aggregation of length 4 orthogonal cover code groups.

According to one or more embodiments of the disclosure, the length 8 orthogonal cover code is achieved by aggregating two length 4 orthogonal cover code groups belonging to a pair of legacy LTE CSI-RS resources where the pair of legacy resources and which length 4 orthogonal cover code groups are chosen from a constrained set of pairs that are chosen to minimize loss of orthogonality of the length 8 cover code due to channel variations in time and frequency domains. According to one aspect of this embodiment, the network node signals to the wireless device one or more 8-port CSI-RS configuration and CDM-4 group combination pairs that are chosen during the aggregation of length 4 orthogonal cover code groups or one or more indices that represent one or more 8-port CSI-RS configuration and CDM-4 group combination pairs that are chosen during the aggregation of length 4 orthogonal cover code groups.

According to one or more embodiments of the disclosure, the aggregation of length 4 orthogonal cover codes with the same group number in a pair of 8-port CSI-RS configurations is allowed. According to one or more embodiments of the disclosure, the aggregation of length 4 orthogonal cover code groups within the same 8-port CSI-RS configuration is allowed in combination with the aggregation of length 4 orthogonal cover codes between a pair of 8-port CSI-RS configurations.

According to one embodiment of the disclosure, a network node is provided. The network node includes processing circuitry configured to: select a first set and second set of reference signal resources in a subframe, and aggregate the first set and second set of reference signal resources to the subframe to form a code division multiplexing, CDM, aggregation configuration. The first set and second set of reference signal resources in the subframe satisfies a temporal criterion such that any two resource elements in the first set and second set of reference signal resources have up to a maximum time separation of six OFDM symbols. The first set and second set of reference signal resources in the subframe satisfies a frequency criterion such that any two resource elements in the first set and second set of reference signal resources have up to a maximum frequency separation of six subcarriers.

According to one embodiment of this aspect, the first set of reference signal resources corresponds to a first portion of a first reference signal configuration. The second set of reference signal resources corresponds to a second portion of a second reference signal configuration. According to one embodiment of this aspect, the first reference signal configuration is at least a first channel state information-reference signal, CSI-RS, configuration. The second reference signal configuration is at least a second CSI-RS configuration different from the at least first CSI-RS configuration. According to one embodiment of this aspect, the first set of reference signal resources in the subframe includes a subset of resources from an eight port CSI-RS resource configuration. The second set of reference signal resources in the subframe includes a subset of resources in a different eight port CSI-RS resource configuration different from the eight port CSI-RS resource configuration corresponding to the first set of reference signal resources. The CDM aggregation configuration has an orthogonal cover code of length eight. According to one embodiment of this aspect, processing circuitry is further configured to communicate the CDM aggregation configuration to a wireless device.

According to another aspect of the disclosure, a method is provided. A first set and second set of reference signal resources. The first set and second set of reference signal resources are aggregated to the subframe to form a code division multiplexing, CDM, aggregation configuration. The first set and second set of reference signal resources in the subframe satisfy a temporal criterion such that any two resource elements in the first set and second set of reference signal resources have up to a maximum time separation of six OFDM symbols. The first set and second set of reference signal resources in the subframe satisfy a frequency criterion such that any two resource elements in the first set and second set of reference signal resources have up to a maximum frequency separation of six subcarriers.

According to one embodiment of this aspect, the first set of reference signal resources corresponds to a first portion of a first reference signal configuration. The second set of reference signal resources corresponds to a second portion of a second reference signal configuration. According to one embodiment of this aspect, the first reference signal configuration is at least a first channel state information-reference signal, CSI-RS, configuration. The second reference signal configuration is at least a second CSI-RS configuration different from the at least first CSI-RS configuration. According to one embodiment of this aspect, the first set of reference signal resources in the subframe includes a subset of resources from an eight port CSI-RS resource configuration. The second set of reference signal resources in the subframe includes a subset of resources in a different eight port CSI-RS resource configuration different from the eight port CSI-RS resource configuration corresponding to the first set of reference signal resources. The CDM aggregation configuration has an orthogonal cover code of length eight.

According to another aspect of the disclosure, a wireless device is provided. The wireless device includes processing circuitry configured to receive a CDM aggregation configuration corresponding to an aggregated first set and second set of reference signal resources in a subframe. The processing circuitry is further configured to perform channel estimation based on the CDM aggregation configuration. The first set and second set of reference signal resources in the subframe satisfy a temporal criterion such that any two resource elements in the first set and second set of reference signal resources have up to a maximum time separation of six OFDM symbols. The first set and second set of reference signal resources in the subframe satisfy a frequency criterion such that any two resource elements in the first set and second set of reference signal resources have up to a maximum frequency separation of six subcarriers.

According to one embodiment of this aspect, the first set of reference signal resources corresponds to a first portion of a first reference signal configuration. The second set of reference signal resources corresponds to a second portion of a second reference signal configuration. According to one embodiment of this aspect, the first reference signal configuration is at least a first channel state information-reference signal, CSI-RS, configuration. The second reference signal configuration is at least a second CSI-RS configuration different from the at least first CSI-RS configuration. According to one embodiment of this aspect, the first set of reference signal resources in the subframe includes a subset of resources from an eight port CSI-RS resource configuration. The second set of reference signal resources in the subframe includes a subset of resources in a different eight port CSI-RS resource configuration different from the eight port CSI-RS resource configuration corresponding to the first set of reference signal resources. The CDM aggregation configuration has an orthogonal cover code of length eight. According to one embodiment of this aspect, the processing circuitry is further configured to map the selected first set and second set of reference signal resources in the subframe to a plurality of antenna ports.

According to another aspect of the disclosure, a method for a wireless device is provided. A CDM aggregation configuration corresponding to an aggregated first set and second set of reference signal resources in a subframe is received. Channel estimation is performed based on the CDM aggregation configuration. The first set and second set of reference signal resources in the subframe satisfy a temporal criterion such that any two resource elements in the first set and second set of reference signal resources have up to a maximum time separation of six OFDM symbols. The first set and second set of reference signal resources in the subframe satisfy a frequency criterion such that any two resource elements in the first set and second set of reference signal resources have up to a maximum frequency separation of six subcarriers.

According to one embodiment of this aspect, the first set of reference signal resources corresponds to a first portion of a first reference signal configuration. The second set of reference signal resources corresponds to a second portion of a second reference signal configuration. According to one embodiment of this aspect, the first reference signal configuration is at least a first channel state information-reference signal, CSI-RS, configuration. The second reference signal configuration is at least a second CSI-RS configuration different from the at least first CSI-RS configuration. According to one embodiment of this aspect, the first set of reference signal resources in the subframe includes a subset of resources from an eight port CSI-RS resource configuration. The second set of reference signal resources in the subframe includes a subset of resources in a different eight port CSI-RS resource configuration different from the eight port CSI-RS resource configuration corresponding to the first set of reference signal resources. The CDM aggregation configuration has an orthogonal cover code of length eight. According to one embodiment of this aspect, the selected first set and second set of reference signal resources in the subframe are mapped to a plurality of antenna ports.

According to another aspect of the disclosure, a network node is provided. The network node includes an aggregation processing module configured to select a first set and second set of reference signal resources in a subframe, aggregate the first set and second set of reference signal resources to the subframe to form a code division multiplexing, CDM, aggregation configuration. The first set and second set of reference signal resources in the subframe satisfy a temporal criterion such that any two resource elements in the first set and second set of reference signal resources have up to a maximum time separation of six OFDM symbols. The first set and second set of reference signal resources in the subframe satisfy a frequency criterion such that any two resource elements in the first set and second set of reference signal resources have up to a maximum frequency separation of six subcarriers.

According to another aspect of the disclosure, a wireless device is provided. The wireless device includes a channel processing module configured to receive a CDM aggregation configuration corresponding to an aggregated first set and second set of reference signal resources in a subframe. The channel processing module is further configured to perform channel estimation based on the CDM aggregation configuration. The first set and second set of reference signal resources in the subframe satisfies a temporal criterion such that any two resource elements in the first set and second set of reference signal resources have up to a maximum time separation of six OFDM symbols. The first set and second set of reference signal resources in the subframe satisfies a frequency criterion such that any two resource elements in the first set and second set of reference signal resources have up to a maximum frequency separation of six subcarriers.

According to one aspect of the disclosure, a network node is provided. The network node includes processing circuitry configured to: select a first set and second set of reference signal resources in a subframe and aggregate the first set and second set of reference signal resources in the subframe to form a code division multiplexing, CDM, aggregation configuration. The first set and second set of reference signal resources in the subframe satisfy a temporal criterion such that any two resource elements in the first set and second set of reference signal resources have up to a maximum time separation of six OFDM symbols. The first set and second set of reference signal resources in the subframe satisfy a frequency criterion such that any two resource elements in the first set and second set of reference signal resources have up to a maximum frequency separation of six subcarriers.

According to one embodiment of this aspect, the first set of reference signal resources corresponds to a first portion of a first reference signal configuration. The second set of reference signal resources corresponds to a second portion of a second reference signal configuration. According to one embodiment of this aspect, the first reference signal configuration is at least a first channel state information-reference signal, CSI-RS, configuration. The second reference signal configuration is at least a second CSI-RS configuration different from the at least first CSI-RS configuration.

According to one embodiment of this aspect, the first set of reference signal resources in the subframe includes a subset of resources from an eight port CSI-RS resource configuration. The second set of reference signal resources in the subframe includes a subset of resources in a different eight port CSI-RS resource configuration different from the eight port CSI-RS resource configuration corresponding to the first set of reference signal resources. The CDM aggregation configuration has an orthogonal cover code of length eight. According to one embodiment of this aspect, the processing circuitry is further configured to communicate the CDM aggregation configuration to a wireless device. According to one embodiment of this aspect, the CDM aggregation configuration is an aggregation of two CDM-4 groups.

According to another aspect of the disclosure, a method is provided. A first set and second set of reference signal resources in a subframe are selected. The first set and second set of reference signal resources are aggregated to the subframe to form a code division multiplexing, CDM, aggregation configuration. The first set and second set of reference signal resources in the subframe satisfy a temporal criterion such that any two resource elements in the first set and second set of reference signal resources have up to a maximum time separation of six OFDM symbols. The first set and second set of reference signal resources in the subframe satisfy a frequency criterion such that any two resource elements in the first set and second set of reference signal resources have up to a maximum frequency separation of six subcarriers.

According to one embodiment of this aspect, the first set of reference signal resources corresponds to a first portion of a first reference signal configuration. The second set of reference signal resources corresponds to a second portion of a second reference signal configuration. According to one embodiment of this aspect, the first reference signal configuration is at least a first channel state information-reference signal, CSI-RS, configuration. The second reference signal configuration is at least a second CSI-RS configuration different from the at least first CSI-RS configuration. According to one embodiment of this aspect, the first set of reference signal resources in the subframe includes a subset of resources from an eight port CSI-RS resource configuration. The second set of reference signal resources in the subframe includes a subset of resources in a different eight port CSI-RS resource configuration different from the eight port CSI-RS resource configuration corresponding to the first set of reference signal resources. The CDM aggregation configuration having an orthogonal cover code of length eight.

According to one embodiment of this aspect, the CDM aggregation configuration is communicated to a wireless device. According to one embodiment of this aspect, the CDM aggregation configuration is an aggregation of two CDM-4 groups.

According to another aspect of the disclosure, a wireless device is provided. The wireless device includes processing circuitry configured to receive a CDM aggregation configuration corresponding to an aggregated first set and second set of reference signal resources in a subframe and perform channel estimation based on the CDM aggregation configuration. The first set and second set of reference signal resources satisfy a temporal criterion such that any two resource elements in the first set and second set of reference signal resources have up to a maximum time separation of six OFDM symbols. The first set and second set of reference signal resources satisfy a frequency criterion such that any two resource elements in the first set and second set of reference signal resources have up to a maximum frequency separation of six subcarriers.

According to one embodiment of this aspect, the first set of reference signal resources corresponds to a first portion of a first reference signal configuration. The second set of reference signal resources corresponds to a second portion of a second reference signal configuration. According to one embodiment of this aspect, the first reference signal configuration is at least a first channel state information-reference signal, CSI-RS, configuration. The second reference signal configuration is at least a second CSI-RS configuration different from the at least first CSI-RS configuration.

According to one embodiment of this aspect, the first set of reference signal resources in the subframe includes a subset of resources from an eight port CSI-RS resource configuration. The second set of reference signal resources in the subframe includes a subset of resources in a different eight port CSI-RS resource configuration different from the eight port CSI-RS resource configuration corresponding to the first set of reference signal resources. The CDM aggregation configuration having an orthogonal cover code of length eight. According to one embodiment of this aspect, the processing circuitry is further configured to map the selected first set and second set of reference signal resources in the subframe to a plurality of antenna ports. According to one embodiment of this aspect, the CDM aggregation configuration is an aggregation of two CDM-4 groups.

According to another aspect of the disclosure, a method for a wireless device is provided. A CDM aggregation configuration corresponding to an aggregated first set and second set of reference signal resources in a subframe is received. The first set and second set of reference signal resources. Channel estimation is performed based on the CDM aggregation configuration. The first set and second set of reference signal resources satisfy a temporal criterion such that any two resource elements in the first set and second set of reference signal resources have up to a maximum time separation of six OFDM symbols. The first set and second set of reference signal resources satisfy a frequency criterion such that any two resource elements in the first set and second set of reference signal resources have up to a maximum frequency separation of six subcarriers.

According to one embodiment of this aspect, the first set of reference signal resources corresponds to a first portion of a first reference signal configuration. The second set of reference signal resources corresponds to a second portion of a second reference signal configuration. According to one embodiment of this aspect, the first reference signal configuration is at least a first channel state information-reference signal, CSI-RS, configuration. The second reference signal configuration is at least a second CSI-RS configuration different from the at least first CSI-RS configuration.

According to one embodiment of this aspect, the first set of reference signal resources in the subframe includes a subset of resources from an eight port CSI-RS resource configuration. The second set of reference signal resources in the subframe includes a subset of resources in a different eight port CSI-RS resource configuration different from the eight port CSI-RS resource configuration corresponding to the first set of reference signal resources. The CDM aggregation configuration has an orthogonal cover code of length eight.

According to one embodiment of this aspect, the CDM aggregation configuration is an aggregation of two CDM-4 groups. According to one embodiment of this aspect, the selected first set and second set of reference signal resources in the subframe are mapped to a plurality of antenna ports.

According to another aspect of the disclosure, a network node is provided. The network node includes an aggregation processing module configured to: select a first set and second set of reference signal resources in a subframe and aggregate the first set and second set of reference signal resources to the subframe to form a code division multiplexing, CDM, aggregation configuration. The first set and second set of reference signal resources in the subframe satisfy a temporal criterion such that any two resource elements in the first set and second set of reference signal resources have up to a maximum time separation of six OFDM symbols. The first set and second set of reference signal resources in the subframe satisfy a frequency criterion such that any two resource elements in the first set and second set of reference signal resources have up to a maximum frequency separation of six subcarriers.

According to one aspect of the disclosure, a wireless device is provided. The wireless device includes a channel processing module configured to: receive a CDM aggregation configuration corresponding to an aggregated first set and second set of reference signal resources in a subframe, and perform channel estimation based on the CDM aggregation configuration. The first set and second set of reference signal resources satisfy a temporal criterion such that any two resource elements in the first set and second set of reference signal resources have up to a maximum time separation of six OFDM symbols. The first set and second set of reference signal resources satisfy a frequency criterion such that any two resource elements in the first set and second set of reference signal resources have up to a maximum frequency separation of six subcarriers.

According to one embodiment of this aspect, the channel processing module is further configured to communicate the CDM aggregation configuration to a wireless device. According to one embodiment of this aspect, the CDM aggregation configuration is communicated to a wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Number of NZP CSI-RS Configurations

The number of different 12 port and 16 port CSI-RS configurations in a subframe in the LTE Release 13 NZP CSI-RS designs are three and two, respectively. That is, for the 12 port case, three different CSI-RS configurations can be formed where each configuration is formed by aggregating three legacy 4-port CSI-RS configurations. This will consume 36 CSI-RS REs of the 40 CSI-RS REs available for CSI-RS within a physical resource block (PRB). For the 16 port case, two different CSI-RS configurations can be formed where each configuration is formed by aggregating two legacy 8-port CSI-RS configurations. This will consume 32 CSI-RS REs of the 40 CSI-RS REs available for CSI-RS within a resource block (RB).

NZP CSI-RS for 24 and 32 Ports and CDM-8 in LTE Release 14

Figure 1:
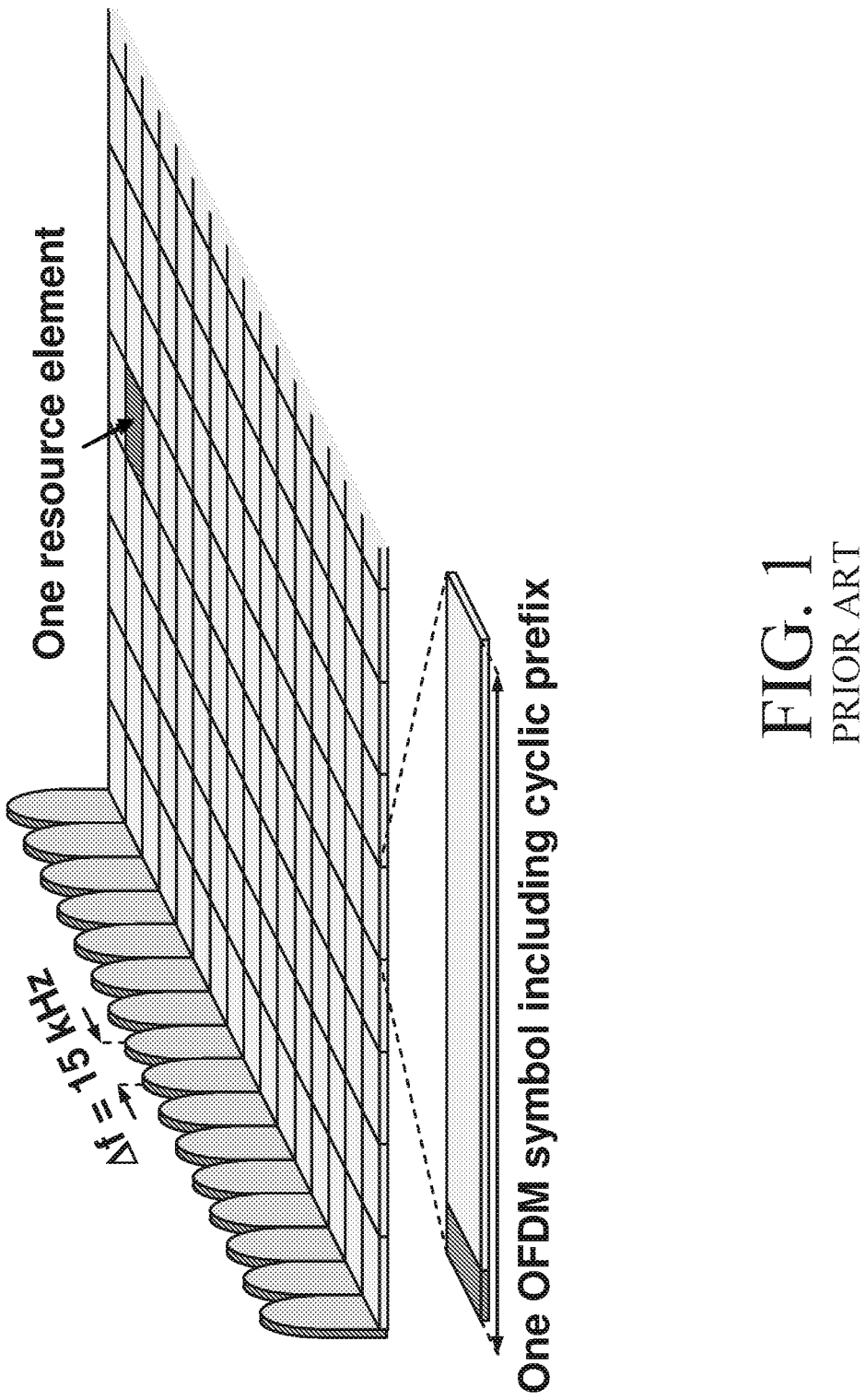
FIG. 1 illustrates a basic LTE downlink physical resource.
Figure 2:
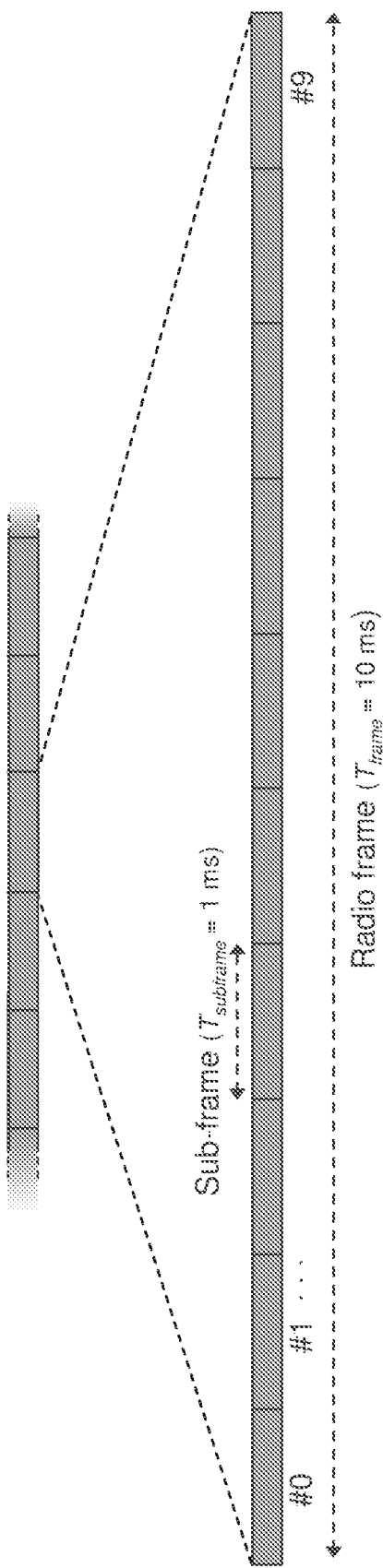
FIG. 2 illustrates an LTE time-domain structure.
Figure 3:
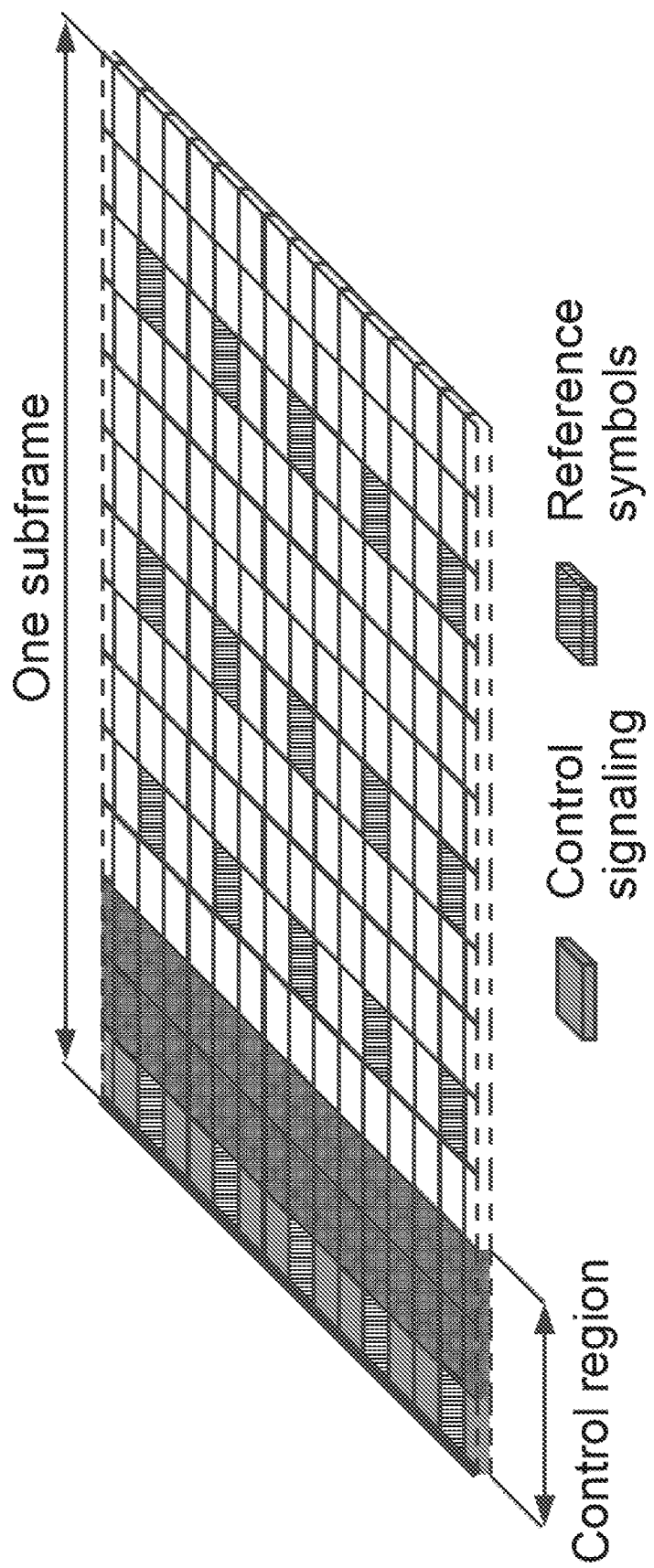
FIG. 3 illustrates a physical resource block within a downlink subframe.
Figure 4:
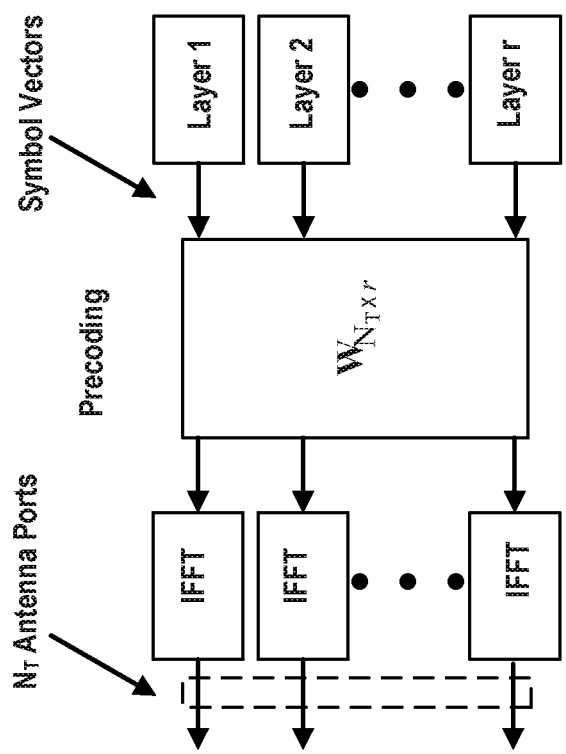
FIG. 4 illustrates a transmission structure of precoded spatial multiplexing mode in LTE.
Figure 5:
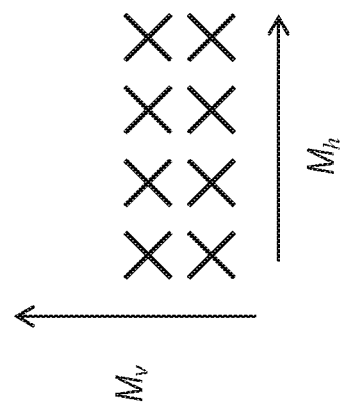
FIG. 5 illustrates a two-dimensional antenna array elements.
Figure 5:
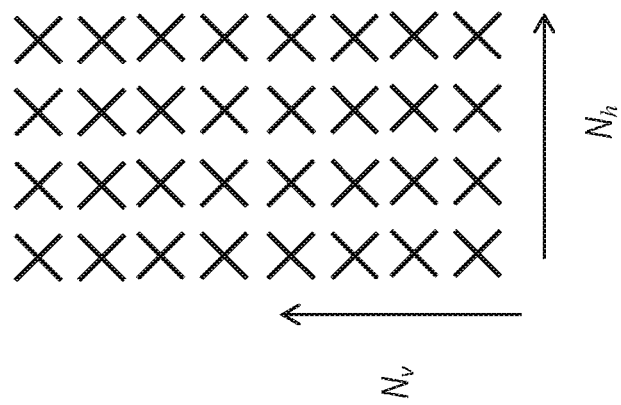
Figure 6:
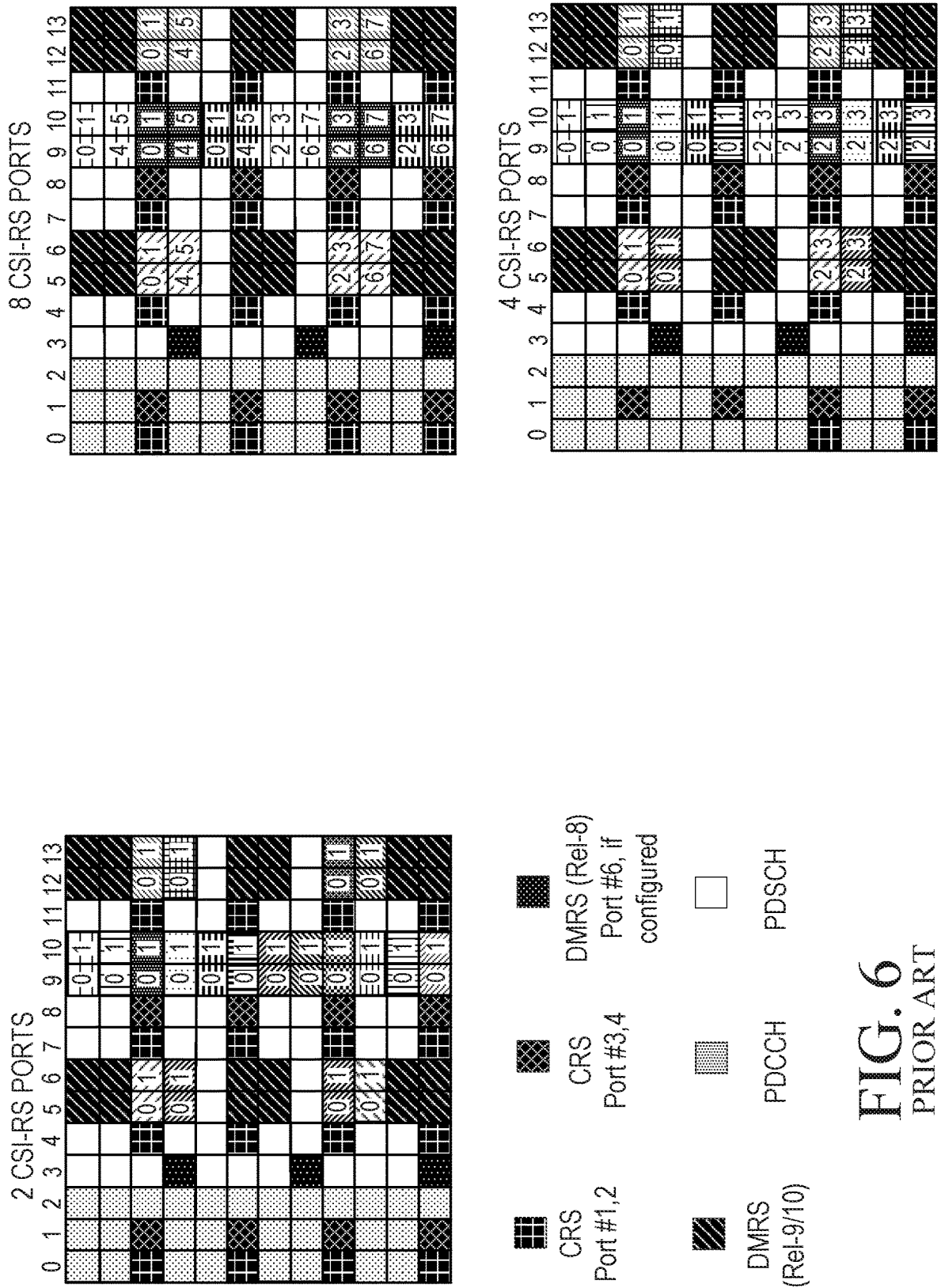
FIG. 6 illustrates a resource element grid.
Figure 7B:
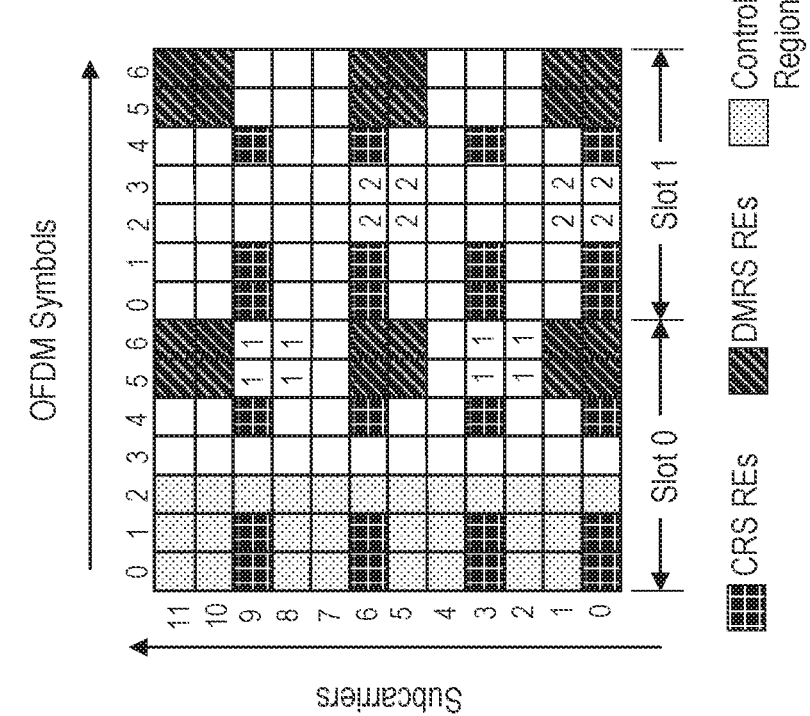
FIG. 7B illustrates an example of aggregating two 8-port resources to form a 16-port NZP CSI-RS Resource, each 4-port resource and 8-port being aggregated together is labeled with the same number.
Figure 7A:
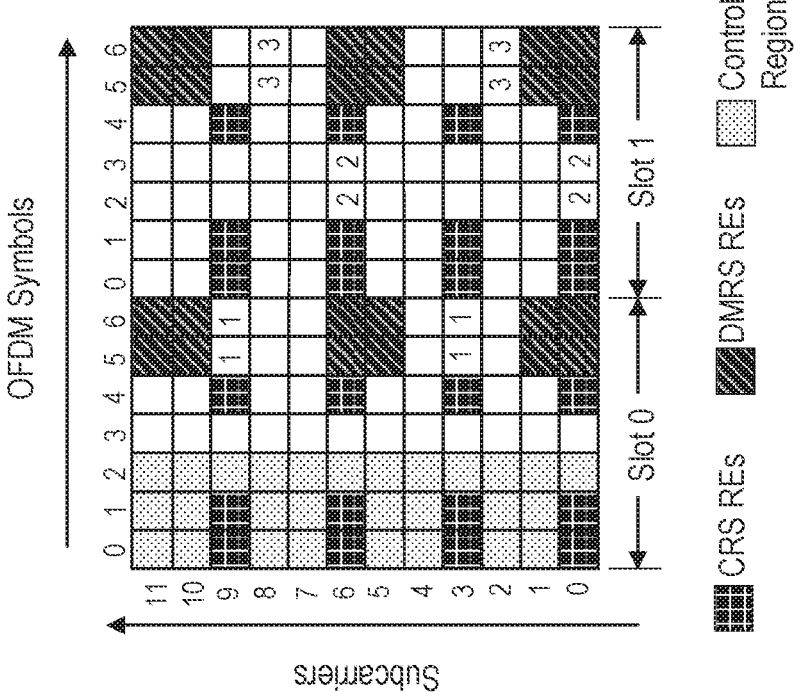
FIG. 7A illustrates an example of aggregating three 4-port resources to form a 12-port NZP CSI-RS Resource.
Figure 8:
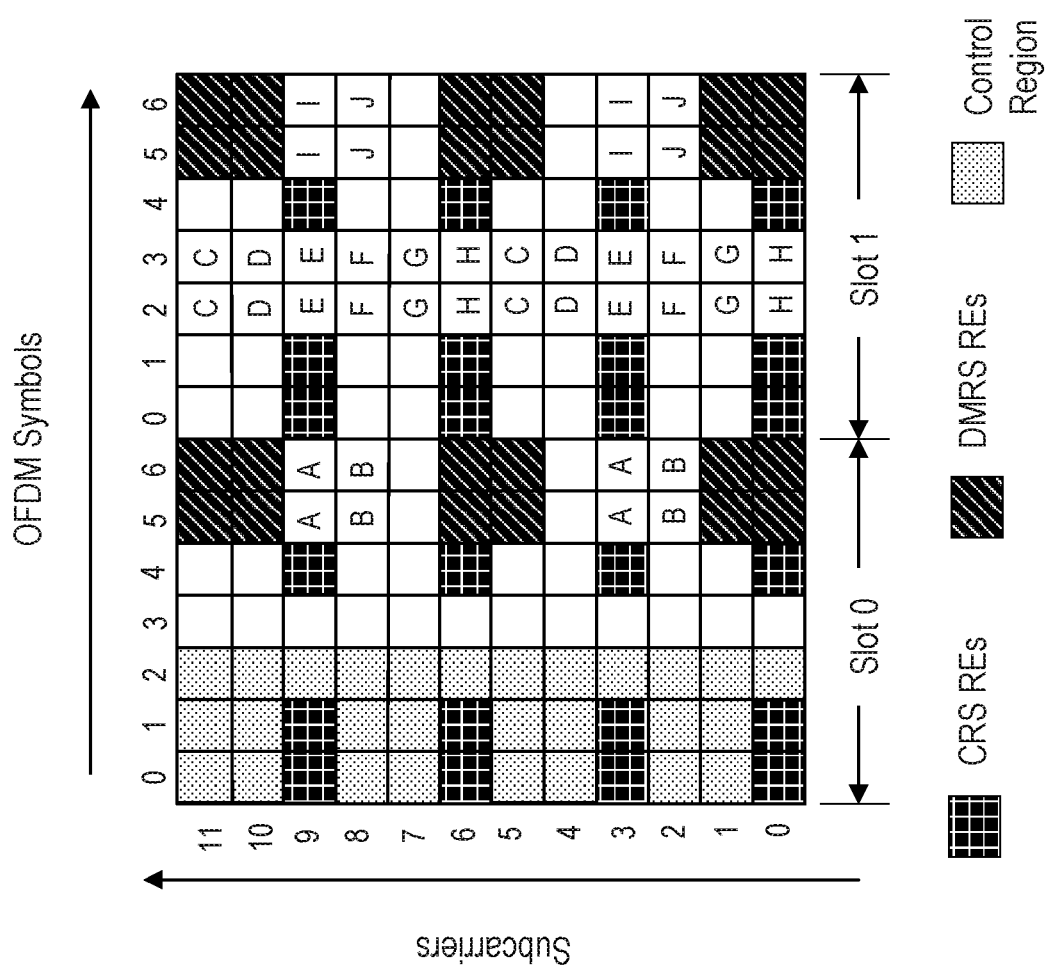
FIG. 8 illustrates NZP CSI-RS design for the case of 12 ports with OCC length 2, where different 4-port resources are denoted by the alphabets A-J.
Figure 9:
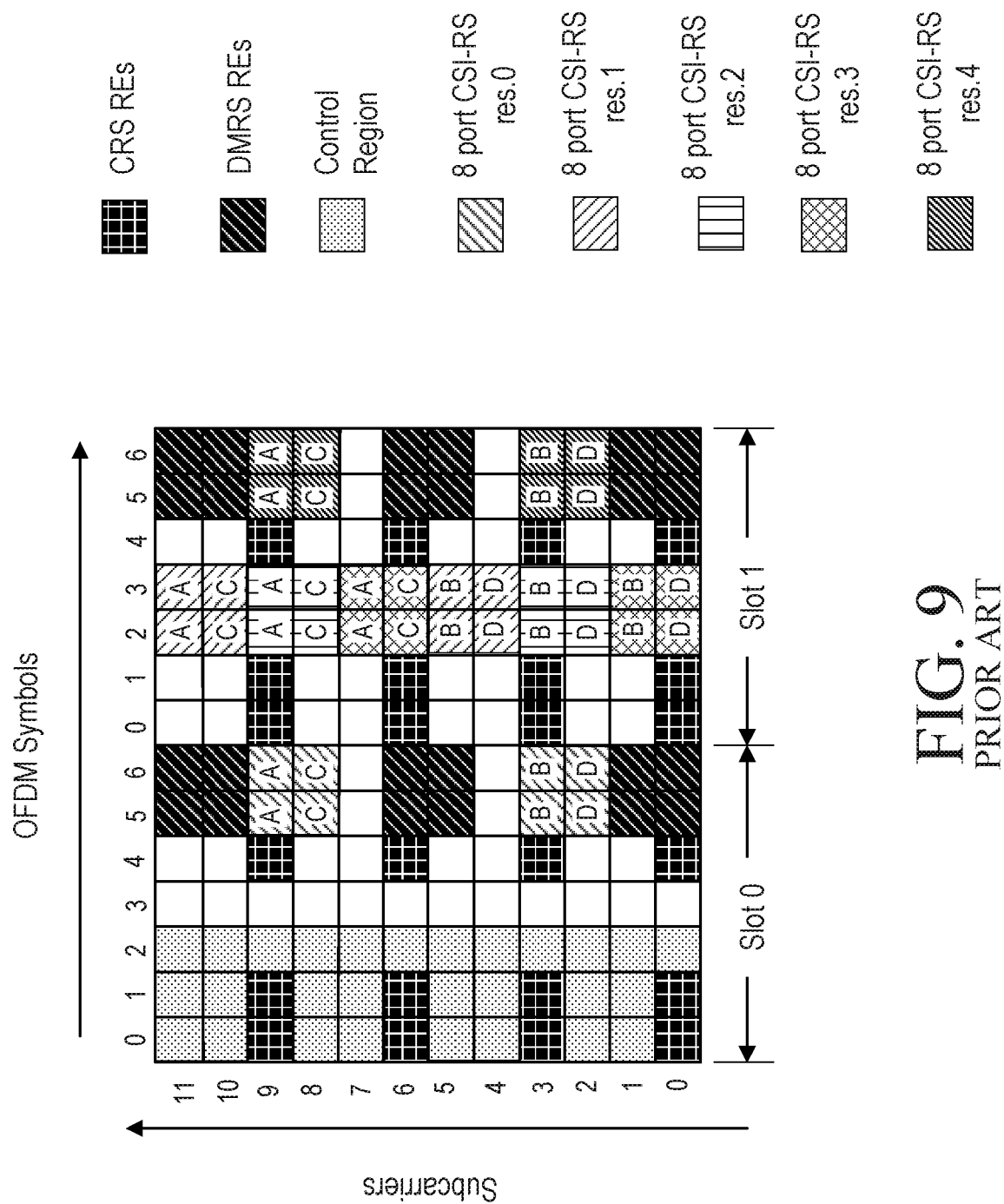
FIG. 9 illustrates NZP CSI-RS design for the case of 16 ports with OCC length 2, where the different 8 port resources.
Figure 11:
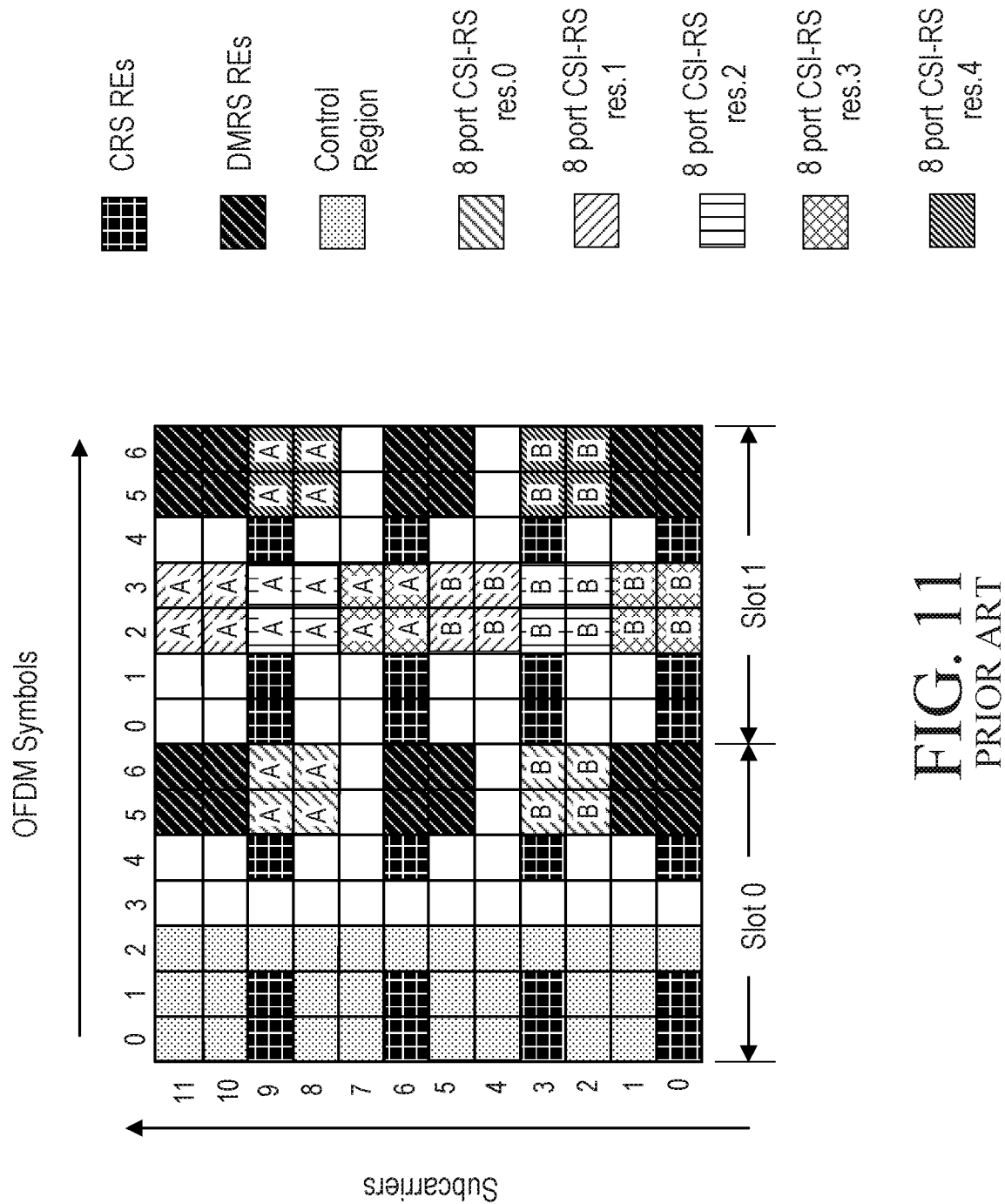
FIG. 11 illustrates NZP CSI-RS design for the case of 16 ports with OCC length 4, where different 8-port resources are shown in the legend, the resource elements with the same alphabet form one CDM group within an 8-port CSI-RS resource.

In LTE Release 14, a NZP CSI-RS configuration with 24 and 32 ports is achieved by aggregating three and four legacy 8-port CSI-RS resources. For instance, in the case of 24 ports three out of the five legacy 8-port resources shown in FIG. 9 and FIG. 11 are aggregated together. Both CDM-2 (i.e., OCC length-2 code) and CDM-4 (i.e., OCC length-4 code) are supported for 24 and 32 ports in Release 14.

In addition, CDM-8 will also be supported in LTE Release 14 for NZP CSI-RS with 24 and 32 ports. A CDM-8 can be defined using a length-8 OCC given by Equation 13. The main motivation for introducing CDM-8 in Release-14 is to support full power utilization for NZP CSI-RS transmission.

$$W_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$ Equation 13

Figure 12:
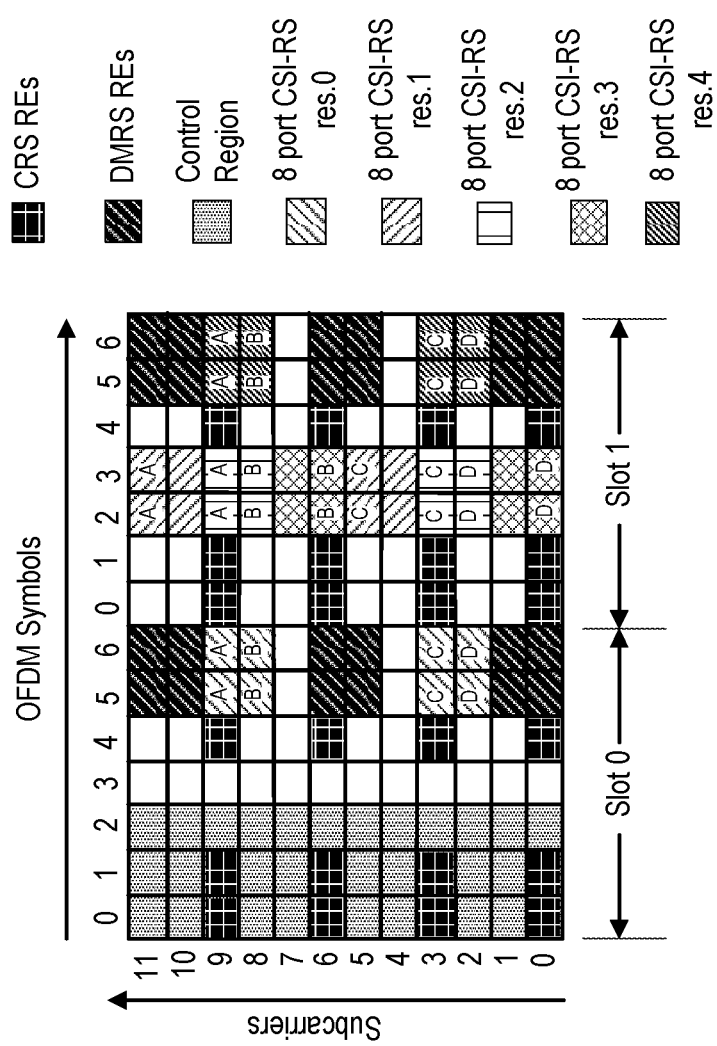
FIG. 12 illustrates a CDM-8 pattern design.

A CDM-8 pattern design is proposed in R1-166341, "CSI-RS design for {20,24,28,32} ports", China Academy of Telecommunications Technology (CATT), 3GPP TSG RAN WG1 Meeting #86, Aug. 22-26, 2016, Gothenburg, Sweden, which is reproduced in FIG. 12. The REs with the same letter in FIG. 12 represent a Code Division Multiplexing (CDM)-8 group. The major drawbacks of this design are as follows:

Each CDM-8 group is spread across 9 OFDM symbols (i.e., from symbol 5 in the first slot to symbol 6 in the second slot). In this design, the orthogonality of the length-8 OCC depends on the flatness of the channel in the time domain. That is, the channel should not vary significantly over the 9 OFDM symbols over which each CDM-8 group is spread. However, in practice, the channel can vary over 9 OFDM symbols due to wireless device mobility and phase drift. Hence, when the channel varies over 9 OFDM symbols due to wireless device mobility or phase drift, the orthogonality of these CDM-8 groups may be destroyed.

The CDM-8 design has extra CSI-RS overhead. For instance, for a 32 port NZP CSI-RS design, this design will use all the CSI-RS REs labeled A-D. Noting that these CSI-RS REs are distributed over all 5 legacy 8-port CSI-RS resources (i.e., resources 0-1 indicated in FIG. 12), then these 5 legacy 8-port CSI-RS resources cannot be used for other wireless devices and legacy wireless devices always have to perform Physical Downlink Shared Channel (PDSCH) rate matching around all 40 CSI-RS REs in these resources. This will result in higher CSI-RS overhead than needed (i.e. a CSI-RS RE overhead increase of $$1 - \frac{40}{32} = 25\%$$

in a subframe carrying CSI-RS transmission). The problem is even worse for 24 port NZP CSI-RS design since all 40 CSI-RS REs cannot be used for other wireless devices (i.e., a CSI-RS RE overhead increase of $$1 - \frac{40}{24} = 67\%$$

in a subframe carrying CSI-RS transmission).

Figure 13:
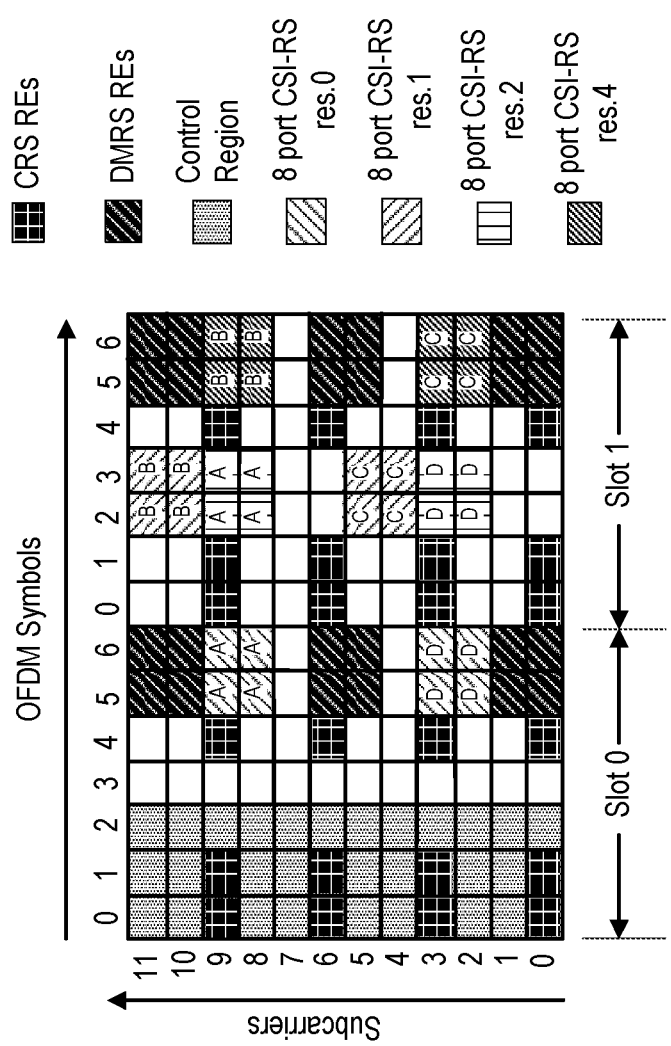
FIG. 13 illustrates a 32-port example.

A CDM-8 approach is proposed in the following references: R1-166519, "Performance comparison of CDM-4 and CDM-8 for CSI-RS", Intel Corporation, 3GPP TSG RAN WG1 Meeting #86, Aug. 22-26, 2016, Gothenburg, Sweden and R1-167996, "WF on CDM aggregation for NP CSI-RS", Samsung, Xinwei, Ericsson, 3GPP TSG RAN WG1 Meeting #86, Aug. 22-26, 2016, Gothenburg, Sweden, where the CDM-8 group is attained by aggregating two CDM-4 groups in two different legacy 8-port CSI-RS resources. A 32-port example is shown in FIG. 13, where the CDM-8 group denoted by A is formed by aggregating a CDM-4 group from legacy 8-port CSI-RS resource 0 and a CDM-4 group from legacy 8-port CSI-RS resource 2. It is further proposed that the aggregation of the CDM-4 groups is done in the order of the CSI-RS configuration index. For instance, if the four legacy 8-port CSI-RS resources being aggregated together are signaled by the network node to the wireless device as {0, 1, 2, 4}, then legacy 8-port CSI-RS resources 0, 1, 2, and 4 correspond to CSI-RS resource numbers i=0, i=1, i=2, and i=3, respectively (note the CSI-RS resource number i is defined as in Equation 12). Then according to the aggregation criterion in R1-167996, "WF on CDM aggregation for NP CSI-RS", Samsung, Xinwei, Ericsson, 3GPP TSG RAN WG1 Meeting #86, August 22-26, 2016, Gothenburg, Sweden, CDM-4 groups in legacy 8-port CSI-RS resources 0 and 1 (which correspond to i=0 and i=$^1$) are aggregated together to form a CDM-8 group. Similarly, CDM-4 groups in legacy 8-port CSI-RS resources 2 and 4 (which correspond to i=2 and i=3) are aggregated together to form a CDM-8 group. This results in the CDM-8 group patterns shown in FIG. 13.

Figure 14:
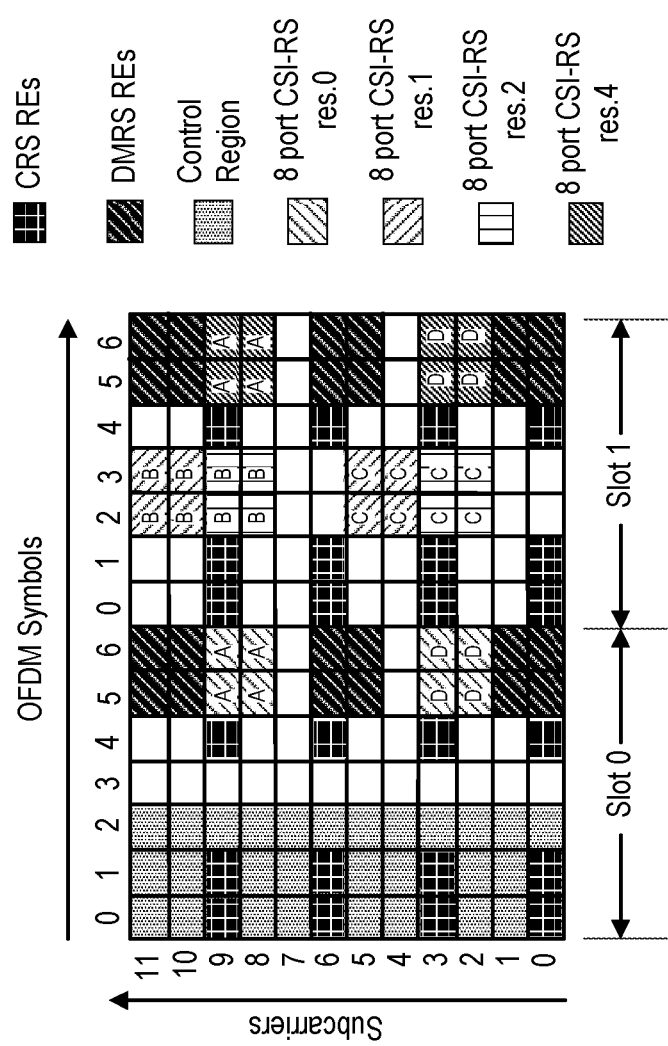
FIG. 14 illustrates CDM-8 group patterns.

However, according to the CDM-8 aggregation criterion in R1-167996, "WF on CDM aggregation for NP CSI-RS", Samsung, Xinwei, Ericsson, 3GPP TSG RAN WG1 Meeting #86, Aug. 22-26, 2016, Gothenburg, Sweden, if the four legacy 8-port CSI-RS resources being aggregated together are signaled by the network node to the wireless device as {0, 4, 1, 2}, then legacy 8-port CSI-RS resources 0, 4, 1, and 2 correspond to CSI-RS resource numbers i=0, i=1, i=2, and i=3, respectively (note the CSI-RS resource number i is defined as in Equation 12). Then according to this aggregation criterion, CDM-4 groups in legacy 8-port CSI-RS resources 0 and 4 (which correspond to i=0 and i=1) are aggregated together to form a CDM-8 group. Similarly, CDM-4 groups in legacy 8-port CSI-RS resources 1 and 2 (which correspond to i=$^2$ and i=$^3$) are aggregated together to form a CDM-8 group. This results in the CDM-8 group patterns shown in FIG. 14. A disadvantage with this CDM-8 grouping is that CDM-8 groups denoted by A and D in FIG. 14 are spread across 9 OFDM symbols. Hence, when the channel varies over 9 OFDM symbols due to wireless device mobility or phase drift, the orthogonality of these CDM-8 groups may be destroyed.

A second disadvantage of the approaches described above is how to support the CDM-8 aggregation for 24 ports. Since there are an odd number (i.e., 3) of legacy 8-port CSI-RS resources being aggregated together to form a 24-port NZP CSI-RS configuration, the approach of aggregating CDM-4 groups in legacy 8-port CSI-RS resources with consecutive CSI-RS resource numbers does not apply. This is due to the lack of a fourth legacy 8-port CSI-RS resource which would otherwise be used for CDM-4 aggregation with the third legacy 8-port CSI-RS resource.

Figure 15:
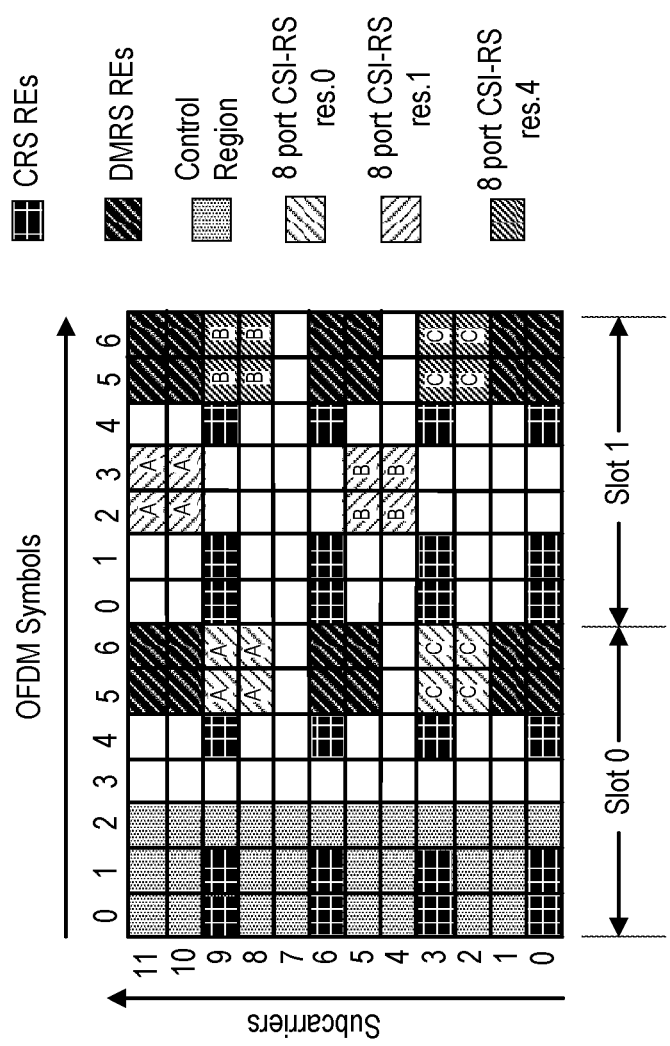
FIG. 15 illustrates a 24-port, CDM-4 aggregation performed in an arbitrary way.

It is possible to perform CDM-4 aggregation in an arbitrary fashion in the case of 24-ports as shown in FIG. 15. However, the resulting CDM-8 group C in FIG. 15 is spread across 9 OFDM symbols. Hence, when the channel varies over 9 OFDM symbols due to wireless device mobility or phase drift, the orthogonality of this CDM-8 group may be destroyed.

Some embodiments of the disclosure aim to solve at least some of the problems with existing systems at least in part by providing for CDM-8 designs via CDM-4 aggregation while minimizing the performance losses due to channel variations in the time and frequency directions. Some embodiments of the disclosure may provide for CDM-8 designs that does not involve any increase in CSI-RS overhead (i.e., 32 CSI-RS REs per PRB will be used for 32 port NZP CSI-RS).

Note that although terminology from 3GPP LTE has been used in this disclosure, this should not be seen as limiting the scope of the disclosure to only the aforementioned system. Other wireless systems, including New Radio (NR), Wide Band Code Division Multiple Access (WCDMA), WiMax, Ultra-Mobile Broadband (UMB) and Global Systems for Mobile communications (GSM), may also benefit from exploiting the ideas covered within this disclosure. Also note that terminology such as network node and wireless device should be considering non-limiting and does in particular not imply a certain hierarchical relation between the two; in general "eNodeB" could be considered as device 1 and "wireless device" device 2, and these two devices communicate with each other over some radio channel. Herein, we also focus on wireless transmissions in the downlink, but some embodiments of the disclosure are equally applicable in the uplink.

Before describing in detail exemplary embodiments, it is noted that the embodiments reside primarily in combinations of apparatus components and processing steps related to CDM aggregation configurations for wireless communications. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The term wireless device used herein may refer to any type of wireless device communicating with a network node and/or with another wireless device in a cellular or mobile communication system. Examples of a wireless device are user equipment (UE), target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

The term "network node" used herein may refer to a radio network node or another network node, e.g., a core network node, Mobile Switching Center (MSC), Mobility Management Entity (MME), Operations and Maintenance (O&M), Operations System Support (OSS), SON, positioning node (e.g. (Evolved Serving Mobile Location Center (E-SMLC)), Minimization Drive Test (MDT) node, etc.

The term "network node" or "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Figure 16:
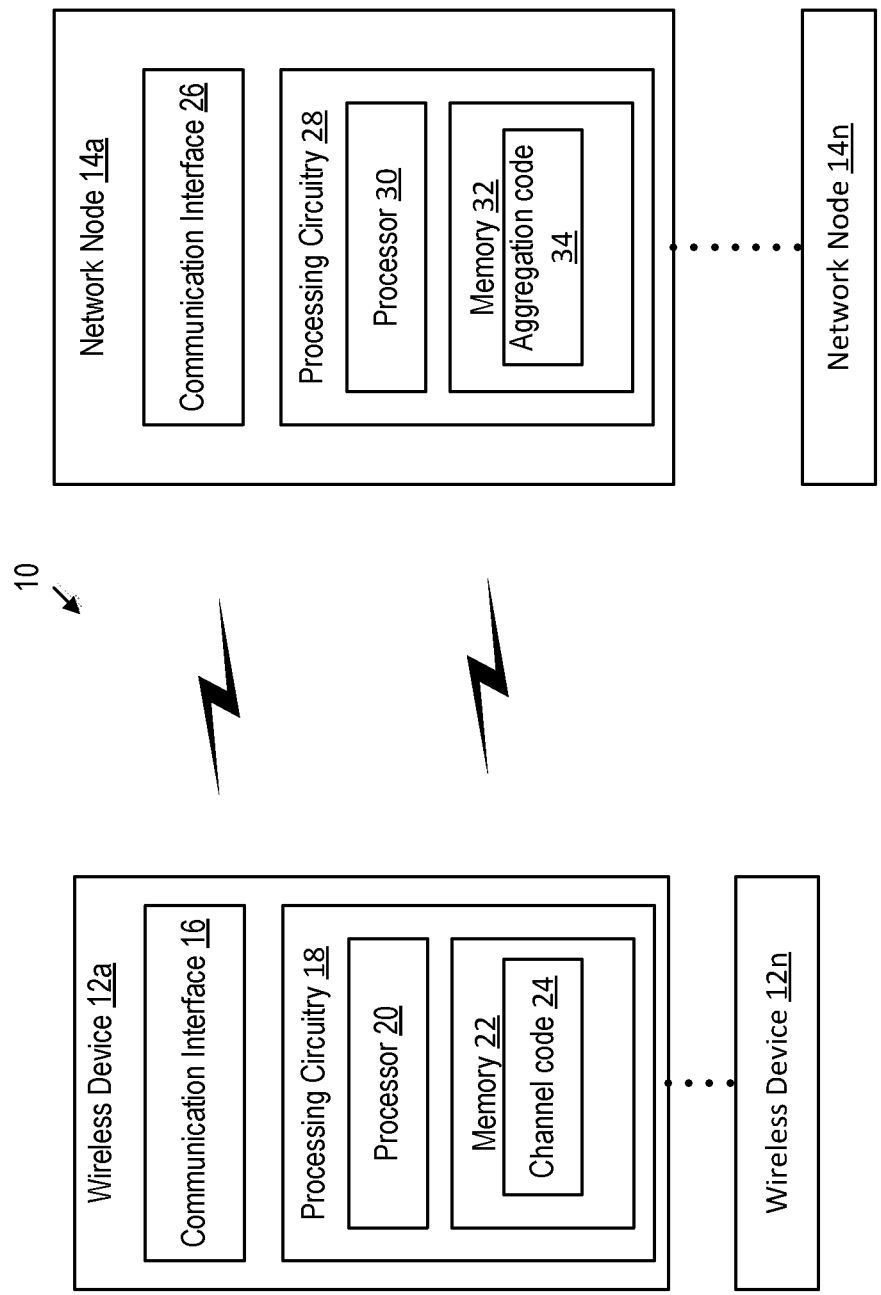
FIG. 16 is a block diagram of a system for code division multiplexing, CDM, aggregation configurations for wireless communications in accordance with the principles of some embodiments of the present disclosure.

Referring now to drawing figures in which like reference designators refer to like elements there is shown in FIG. 16 an exemplary system for code division multiplexing, CDM, aggregation configurations for wireless communications in accordance with the principles of some embodiments of the present disclosure and designated generally as "10." System 10 includes one or more wireless devices 12*a*-12*n* (collectively referred to as wireless device 12) and one or more network nodes 14*a*-14*n* (collectively referred to as network node 14), in communication with each other via one or more communication networks using one or more communication protocols, where wireless device 12 and/or network node 14 are configured to perform the processes described herein.

Wireless device 12 includes one or more communication interfaces 16 for communicating with one or more other wireless devices 12, network nodes 14, and/or other elements in system 10. In one or more embodiments, communication interface 16 includes one or more transmitters and/or one or more receivers. Wireless device 12 includes processing circuitry 18. Processing circuitry 18 includes processor 20 and memory 22. In addition to a traditional processor and memory, processing circuitry 18 may comprise integrated circuitry for processing and/or control, e.g., one or more processors and/or processor cores and/or FPGAs (Field Programmable Gate Array) and/or ASICs (Application Specific Integrated Circuitry). Processor 20 may be configured to access (e.g., write to and/or reading from) memory 22, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 22 may be configured to store code executable by processor 20 and/or other data, e.g., data pertaining to communication, e.g., configuration and/or address data of nodes, etc.

Processing circuitry 18 may be configured to control any of the methods and/or processes described herein and/or to cause such methods and/or processes to be performed, e.g., by wireless device 12. Processor 20 corresponds to one or more processors 20 for performing wireless device 12 functions described herein. Wireless device 12 includes memory 22 that is configured to store data, programmatic software code and/or other information described herein. In one or more embodiments, memory 22 is configured to store Channel code 24. For example, channel code 24 includes instructions that, when executed by processor 20, causes processor 20 to perform the process discussed in detail with respect to FIG. 21 and embodiments discussed herein.

Network node 14 includes one or more communication interfaces 26 for communicating with one or more other network nodes 14, wireless device 12, and/or other elements in system 10. In one or more embodiments, communication interface 26 includes one or more transmitters and/or one or more receivers. Network node 14 includes processing circuitry 28. Processing circuitry 28 includes processor 30 and memory 32. In addition to a traditional processor and memory, processing circuitry 28 may comprise integrated circuitry for processing and/or control, e.g., one or more processors and/or processor cores and/or FPGAs (Field Programmable Gate Array) and/or ASICs (Application Specific Integrated Circuitry). Processor 30 may be configured to access (e.g., write to and/or reading from) memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 32 may be configured to store code executable by processor 30 and/or other data, e.g., data pertaining to communication, e.g., configuration and/or address data of nodes, etc.

Processing circuitry 28 may be configured to control any of the methods and/or processes described herein and/or to cause such methods and/or processes to be performed, e.g., by network node 14. Processor 30 corresponds to one or more processors 30 for performing network node 14 functions described herein. Network node 14 includes memory 32 that is configured to store data, programmatic software code and/or other information described herein. In one or more embodiments, memory 32 is configured to store aggregation code 34. For example, aggregation code 34 includes instructions that, when executed by processor 30, causes processor 30 to perform the process discussed in detail with respect to FIG. 17 and embodiments discussed herein.

Figure 17:
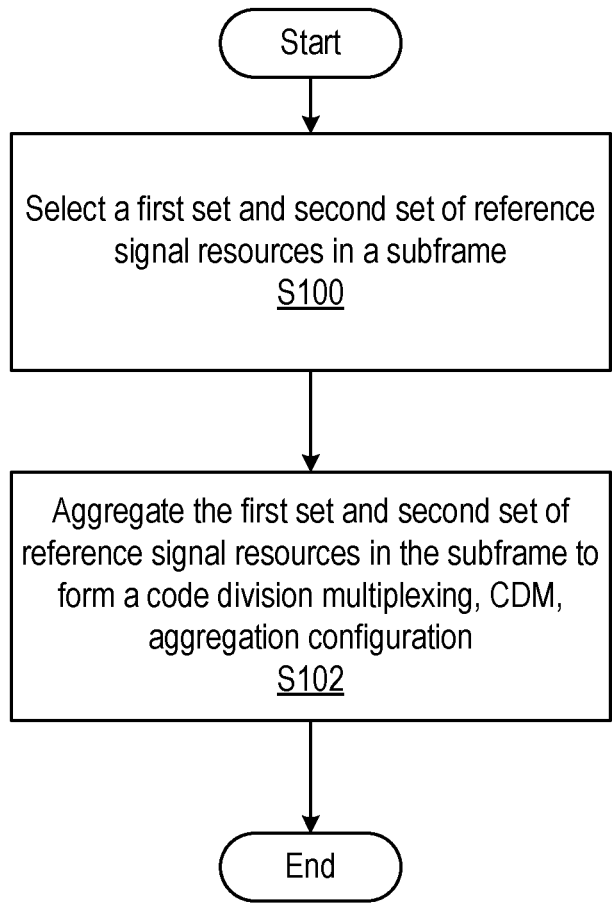
FIG. 17 is a flow diagram of one exemplary embodiment of the aggregation process of aggregation code in accordance with the principles of some embodiments of the disclosure.

FIG. 17 is a flow diagram of one exemplary embodiment of the aggregation process of aggregation code 34 in accordance with the principles of some embodiments of the disclosure. Processing circuitry 28 selects a first set and second set of reference signal resources in a subframe, first set and second set of reference signal resources satisfies a temporal criterion and a frequency criterion for separation between resource elements (Block S100). Processing circuitry 28 is further configured to aggregate the first set and second set of reference signal resources to the subframe to form a CDM aggregation configuration (Block S102). In one or more embodiments, processing circuitry 28 communicates CDM aggregation configuration to a wireless device 12.

In one or more embodiments (collectively referred to as Embodiment A), to minimize the risk of performance losses due to channel variations across OFDM symbols, some constraints are introduced on which pair of legacy 8-port CSI-RS resources can be used to perform CDM-4 aggregation. The pair of legacy 8-port CSI-RS resources are chosen such that the largest time separation between CSI-RS REs in the two legacy 8-port CSI-RS resources is limited to less than 6 OFDM symbols. For instance, the CSI-RS REs in legacy 8-port CSI-RS resources 0 and 2 have a maximum separation of 6 OFDM symbols (i.e., referring to FIG. 11, CSI-RS REs of legacy 8-port CSI-RS resource 0 in OFDM symbol 5 of the first slot are separated by 6 OFDM symbols from the CSI-RS REs of legacy 8-port CSI-RS resource 2 in OFDM symbol 3). This can help reduce the performance losses due to channel variations in time, as this approach only requires the channel to be invariant over a maximum of 6 OFDM symbols to ensure orthogonality within the resulting CDM-8 groups. The list of allowed pairs of legacy 8-port CSI-RS resources over which CDM-4 aggregation can be performed to obtain a CDM-8 group is given in Table 5 that illustrates a list of 8-port CSI-RS configuration pairings for CDM-4 aggregation.

TABLE 5

List of Allowed 8-port CSI-RS Configuration Pairings for CDM-4 Aggregation

| CDM-4 Aggregation Configurations | Pair of 8 port CSI-RS Configurations | |
|---|---|---|
| 0 | 0 | 1 |
| 1 | 0 | 2 |
| 2 | 0 | 3 |
| 3 | 1 | 2 |
| 4 | 1 | 3 |
| 5 | 1 | 4 |
| 6 | 2 | 3 |
| 7 | 2 | 4 |
| 8 | 3 | 4 |

Table 5 indicates the pair of 8-port CSI-RS configurations that can be in any order. For instance the pair (3,4) corresponding to the last row of Table 5 applies to both the following cases:

The first 8-port CSI-RS configuration is 3 and the second 8-port CSI-RS configuration is 4;

The first 8-port CSI-RS configuration is 4 and the second 8-port CSI-RS configuration is 3.

The exact order of the 8-port CSI-RS configurations is determined by the CSI-RS resource number i defined in Equation 12. In some embodiments, one or more CDM-4 aggregation configuration indices (which represents the pair of 8-port CSI-RS configurations) is signaled to the wireless device by the network node via higher layer signaling.

Figure 18:
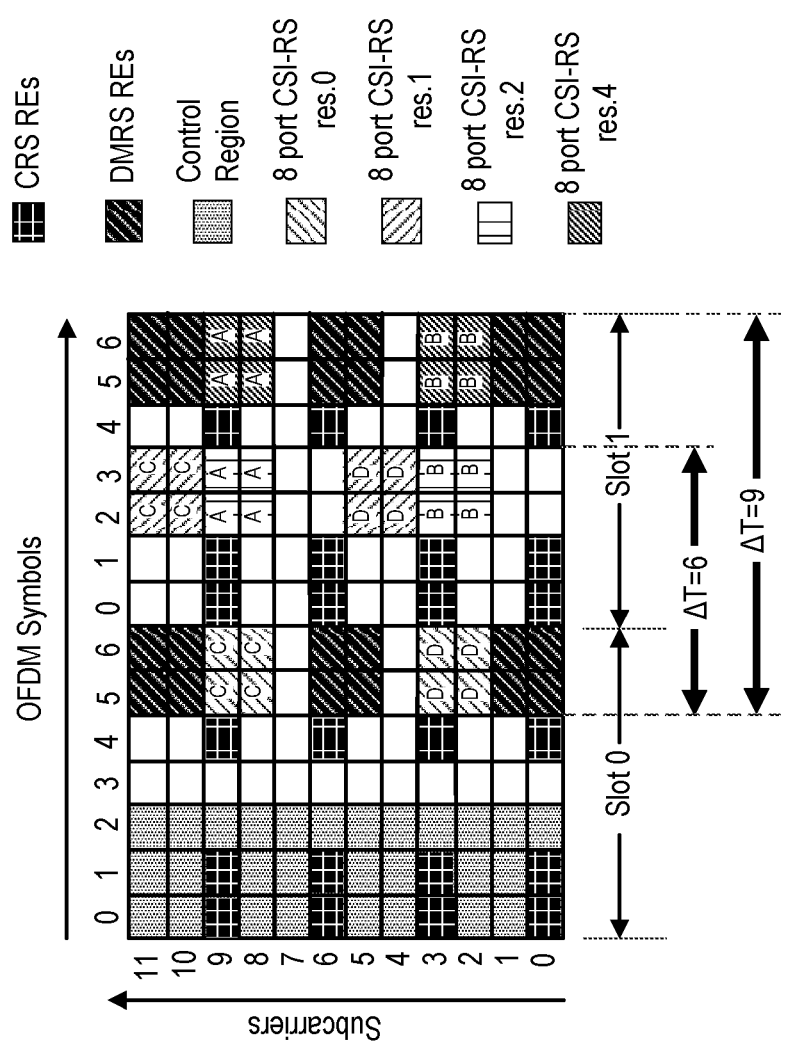
FIG. 18 is a diagram of CDM-8 groups formed by aggregating CDM-4 groups in accordance with the principles of some embodiments of the disclosure.

An example of CDM-8 design using embodiment is given as follows. The network node configures the wireless device with 32 NZP CSI-RS ports by aggregating legacy 8-port CSI-RS resources in the order 4, 0, 2, 1 where resource 4 corresponds to CSI-RS resource number i=0 and resource 1 corresponds to CSI-RS resource number i=3 (note that CSI-RS resource number i is defined as in Equation 12). As a next step, the network node forms CDM-8 groups by aggregating CDM-4 groups across the allowed pairs of legacy 8-port CSI-RS resources given in Table 5. For instance, the network node can aggregate the CDM-4 groups across legacy 8-port resource pairs (2,4) and (0,1) which correspond to CDM-4 aggregation configurations 7 and 0 in Table 5. The resulting CDM-8 groups are shown in FIG. 18. In FIG. 18, CDM-8 groups indicated by A and B are a result of aggregating CDM-4 groups across 8-port CSI-RS resources pairs (2,4); CDM-8 groups indicated by C and D are a result of aggregating CDM-4 groups across 8-port CSI-RS resources pairs (0,1). Note that the resource elements of all 4 CDM-8 groups have a maximum time separation $\Delta T=6$ symbols, as highlighted in FIG. 18 for Group C. Furthermore, groups are not formed from with configurations with maximum time separations of $\Delta T=9$ symbols, as illustrated in example in FIG. 18. In one or more embodiments, network node 14 then indicates CDM-4 aggregation configuration indices 7 and 0 to wireless device 12 via higher layer signaling. The wireless device uses this signal to know the CDM-8 groups being used for NZP CSI-RS transmission and performs channel estimation.

Figure 19:
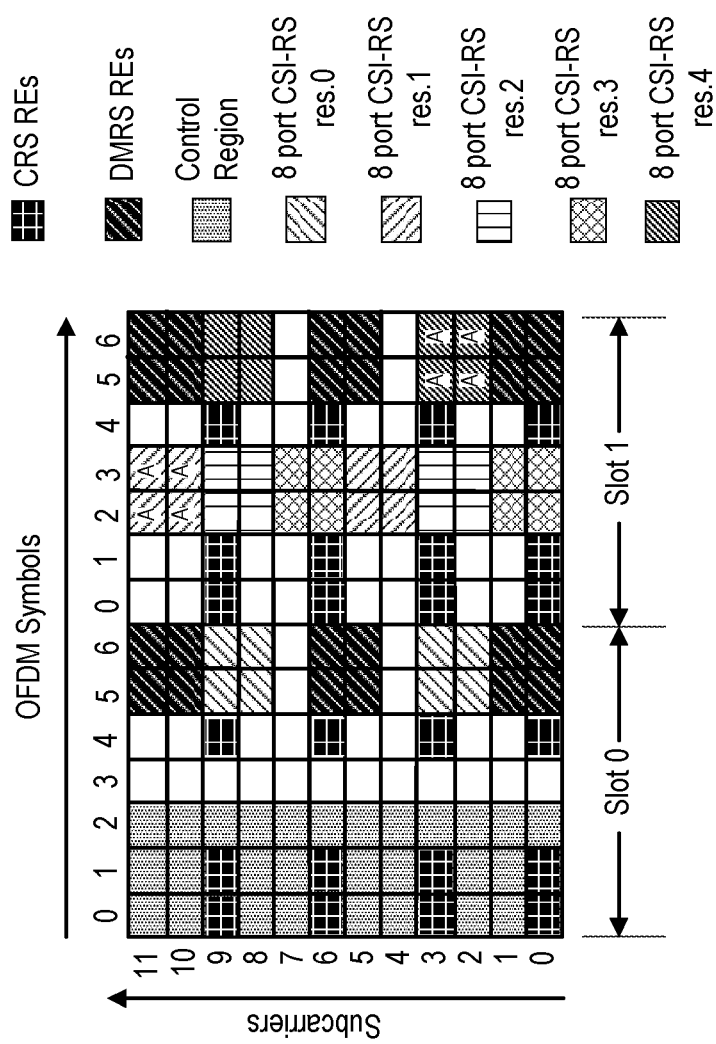
FIG. 19 is a diagram of aggregating CDM-4 groups that could result in performance losses.

In one or more other embodiments (collectively referred to as Embodiment B), according to the list of allowed 8-port CSI-RS configuration pairings in Table 5, the aggregation of CDM-4 groups across 8-port CSI-RS resource configurations 1 and 4 are allowed. However, if the CDM-4 aggregation across 8-port CSI-RS resource configurations 1 and 4 are done as shown in FIG. 19, where the CDM-4 aggregation or resulting CDM-8 group (denoted by CSI-RS REs with A) can suffer from channel variations in the frequency domain. The two CDM-4 groups being aggregated together in FIG. 19 are separated 8 subcarriers. In order for the orthogonality of the CDM-8 group to hold, the channel needs to be invariant over 8 subcarriers, and under deployment scenarios with high delay spread, this condition is not easily met. Hence, in addition to minimizing the risk of performance losses due to channel variations across symbols (as done in Embodiment A), it is also important to limit the performance losses due to channel variations in the frequency domain (i.e., across subcarriers).

Figure 10:
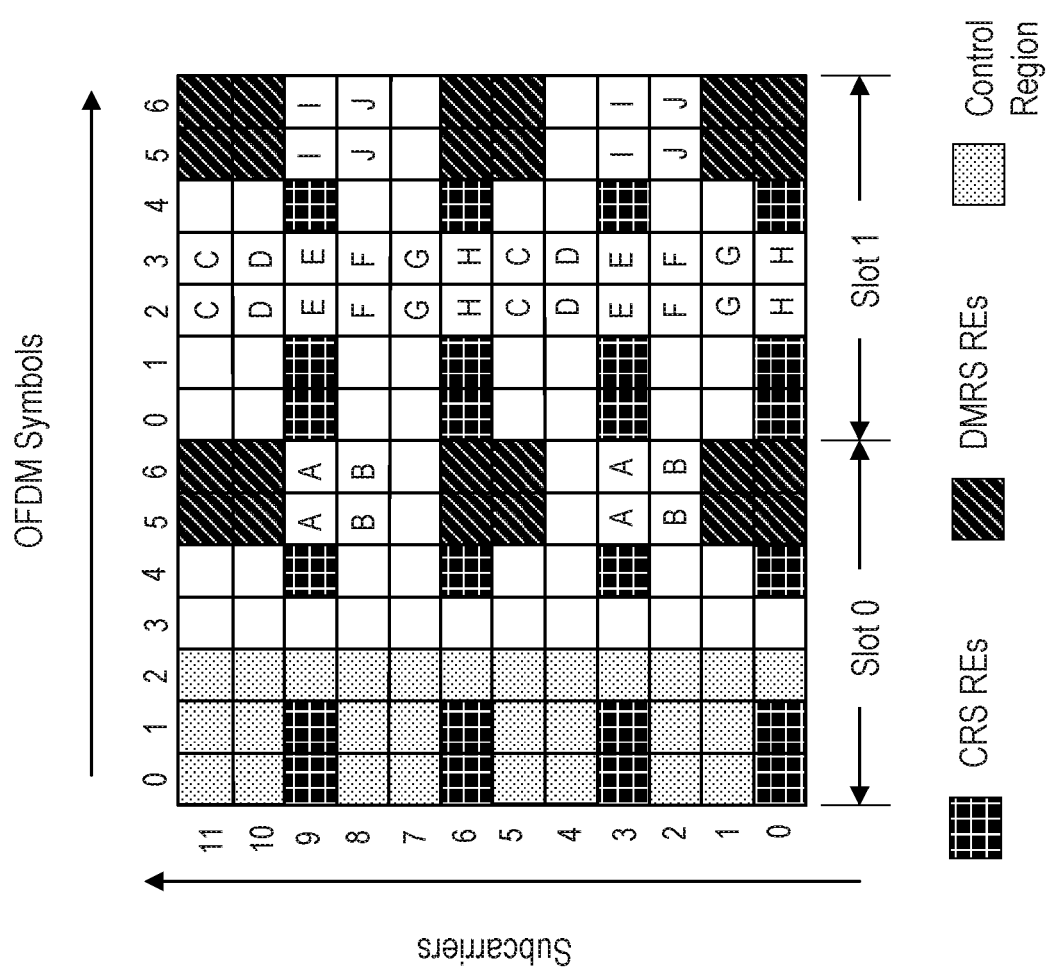
FIG. 10 illustrates NZP CSI-RS design for the case of 12 ports with OCC length 4, where 4-port resources are denoted by the alphabets A-J.

In Embodiment A, additional constraints are introduced on which CDM-4 groups within a pair of legacy 8-port resource configurations can be aggregated together. The two CDM-4 groups within a pair of legacy 8-port resource configurations being aggregated together are selected such that frequency separation between the two groups is no more than 6 subcarriers. The 6 subcarrier maximum separation is selected here since the OCC length 4 code in the case of 12 port NZP CSI-RS designs of LTE Release 13 are also separated by 6 subcarriers (see FIG. 10). The list of allowed CDM-4 aggregations within pairs of legacy 8-port CSI-RS resources to obtain a CDM-8 group is given in Table 6.

TABLE 6

List of Allowed CDM-4 Aggregations within a pair of 8-port CSI-RS configurations

| CDM-4 Configurations Aggregation | 8 port CSI-RS Configuration and CDM-4 group combination pairs | | | |
|---|---|---|---|---|
| | First 8-port CSI-RS resource Configuration | First CDM-4 Group | Second 8-port CSI-RS resource Configuration | Second CDM-4 Group |
| 0 | 0 | i | 1 | i |
| 1 | 0 | i | 1 | ii |
| 2 | 0 | ii | 1 | ii |
| 3 | 0 | i | 2 | i |
| 4 | 0 | i | 2 | ii |
| 5 | 0 | ii | 2 | i |
| 6 | 0 | ii | 2 | ii |
| 7 | 0 | i | 3 | i |
| 8 | 0 | ii | 3 | i |
| 9 | 0 | ii | 3 | ii |
| 10 | 1 | i | 2 | i |
| 11 | 1 | ii | 2 | i |
| 12 | 1 | ii | 2 | ii |
| 13 | 1 | i | 3 | i |
| 14 | 1 | ii | 3 | i |
| 15 | 1 | ii | 3 | ii |
| 16 | 1 | i | 4 | i |
| 17 | 1 | ii | 4 | i |
| 18 | 1 | ii | 4 | ii |
| 19 | 2 | i | 3 | i |
| 20 | 2 | ii | 3 | i |
| 21 | 2 | ii | 3 | ii |
| 22 | 2 | i | 4 | i |
| 23 | 2 | i | 4 | ii |
| 24 | 2 | ii | 4 | i |
| 25 | 2 | ii | 4 | ii |

TABLE 6-continued

List of Allowed CDM-4 Aggregations within a pair of 8-port CSI-RS configurations

| CDM-4 Configurations Aggregation | 8 port CSI-RS Configuration and CDM-4 group combination pairs | | | |
|---|---|---|---|---|
| | First 8-port CSI-RS resource Configuration | First CDM-4 Group | Second 8-port CSI-RS resource Configuration | Second CDM-4 Group |
| 26 | 3 | i | 4 | i |
| 27 | 3 | i | 4 | ii |
| 28 | 3 | ii | 4 | ii |

In Table 6, i and ii represent the first and second CDM-4 groups within a legacy 8-port CSI-RS resource respectively.

It should be noted that Table 6 indicates 8-port CSI-RS configuration and CDM-4 group combination pairs that can be in any order. For instance the combination pairs (3,ii) and (4,ii) corresponding to the last row of Table 6 applies to both the following cases:

The first 8-port CSI-RS configuration is 3 and the second 8-port CSI-RS configuration is 4;

The first 8-port CSI-RS configuration is 4 and the second 8-port CSI-RS configuration is 3.

The exact order of the 8-port CSI-RS configurations is determined by the CSI-RS resource number i defined in Equation 12. In some embodiments, one or more CDM-4 aggregation configuration indices (which represents the 8 port CSI-RS Configuration and CDM-4 group combination pairs) is signaled to the wireless device by network node via higher layer signaling. In an alternate embodiment, only the $1^{st}$ CDM-4 groups between pairs of 8-port CSI-RS configurations are allowed to be aggregated and similarly only the $2^{nd}$ CDM-4 groups between pairs of 8-port CSI-RS configurations are allowed to be aggregated.

An alternative list of allowed CDM-4 aggregations within pairs of legacy 8-port CSI-RS resources to obtain a CDM-8 group is given in Table 7.

TABLE 7

An Alternative List of Allowed CDM-4 Aggregations within a pair of 8-port CSI-RS configurations

| CDM-4 Configurations Aggregation | 8 port CSI-RS Configuration and CDM-4 group combination pairs | | | |
|---|---|---|---|---|
| | First 8-port CSI-RS resource Configuration | First CDM-4 Group | Second 8-port CSI-RS resource Configuration | Second CDM-4 Group |
| 0 | 0 | i | 1 | i |
| 1 | 0 | ii | 1 | ii |
| 2 | 0 | i | 2 | i |
| 3 | 0 | ii | 2 | ii |
| 4 | 0 | i | 3 | i |
| 5 | 0 | ii | 3 | ii |
| 6 | 1 | i | 2 | i |
| 7 | 1 | ii | 2 | ii |
| 8 | 1 | ii | 2 | ii |
| 9 | 1 | i | 3 | i |
| 10 | 1 | ii | 3 | ii |
| 11 | 1 | ii | 3 | ii |
| 12 | 1 | i | 4 | i |
| 13 | 1 | ii | 4 | ii |
| 14 | 2 | i | 3 | i |
| 15 | 2 | ii | 3 | ii |
| 16 | 2 | ii | 3 | ii |
| 17 | 2 | i | 4 | i |

TABLE 7-continued

An Alternative List of Allowed CDM-4 Aggregations within a pair of 8-port CSI-RS configurations

| | 8 port CSI-RS Configuration and CDM-4 group combination pairs | | | |
|---|---|---|---|---|
| CDM-4 Configurations Aggregation | First 8-port CSI-RS resource Configuration | First CDM-4 Group | Second 8-port CSI-RS resource Configuration | Second CDM-4 Group |
| 18 | 2 | ii | 4 | ii |
| 19 | 3 | i | 4 | i |
| 20 | 3 | ii | 4 | ii |

In Table 7, only the $1^{st}$ CDM-4 groups between pairs of 8-port CSI-RS configurations are allowed to be aggregated and similarly only the $2^{nd}$ CDM-4 groups between pairs of 8-port CSI-RS configurations are allowed to be aggregated with the exception of three rows (rows 7, 10 and 15). The reason for choosing the combination pairs listed in rows 7, 10, and 15 is that these combination pairs are located in the same two OFDM symbols (i.e., OFDM symbols 2-3 in the second slot) and have a maximum frequency separation of 6 subcarriers.

Figure 20:
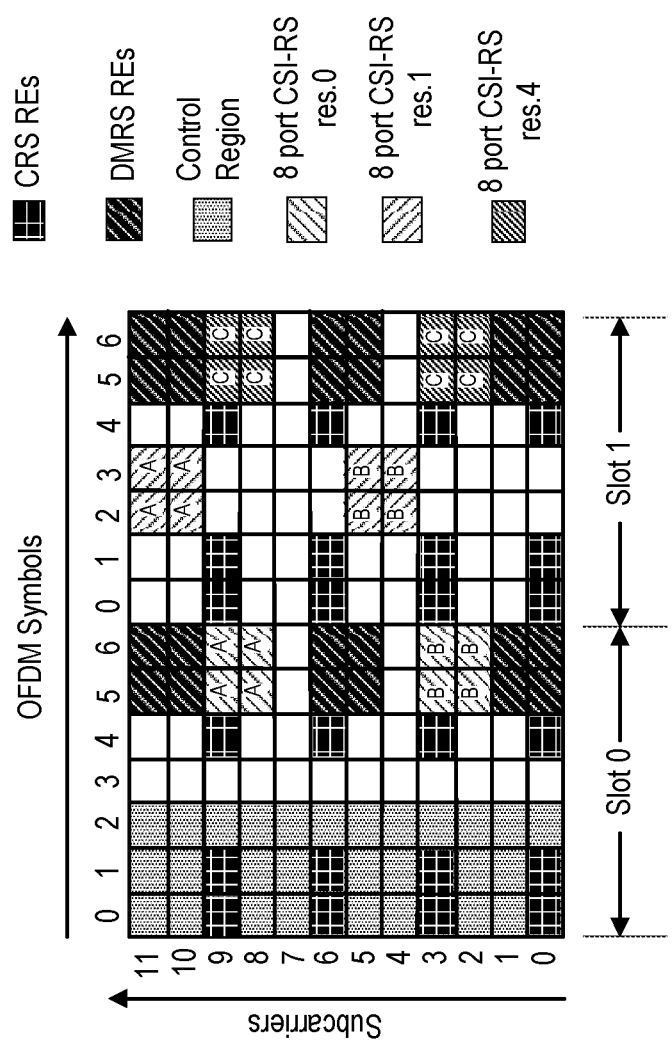
FIG. 20 is a diagram of CDM-4 aggregation within 8-port CSI-RS resource combined with CDM-4 aggregation across a pair of 8-port CSI-RS resources in accordance with the principles of some embodiments of the disclosure.

In a further alternative embodiment, CDM-4 group aggregation within the same 8-port CSI-RS configuration is also allowed. In some cases, CDM-4 aggregation within the same 8-port CSI-RS configuration may be combined with CDM-4 aggregation across pairs of 8-port CSI-RS configurations. An example showing CDM-4 aggregation within 8-port CSI-RS resource combined with CDM-4 aggregation across a pair of 8-port CSI-RS resources in shown in FIG. 20. In FIG. 20, the CDM-8 group indicated by C is formed by CDM-4 group aggregation within the same 8-port CSI-RS configuration.

Antenna Port Numbering

For CSI reference signals transmitted on 24 and 32 antenna ports, the antenna ports will be p=15, . . . , 38 and p=15, . . . , 46 respectively. When aggregating multiple legacy CSI-RS resources of 8 ports to form a CSI-RS resource for 24 or 28 ports, mapping between each antenna port to a CSI-RS RE needs to be defined in order for a wireless device to measure the channel of each antenna port correctly. A number of solutions by using 24 and 32 ports as examples are discussed below.

For CSI reference signals using 24 or 32 antenna ports, $N_{res}^{CSI}$ CSI-RS resource configurations in the same subframe, numbered from 0 to $N_{res}^{CSI}-1$, are aggregated to obtain $N_{res}^{CSI}N_{ports}^{CSI}$ antenna ports in total. Each CSI-RS resource configuration in such an aggregation corresponds to $N_{ports}^{CSI}=8$ antenna ports and one of the CSI-RS configurations in Table 2. $N_{res}^{CSI}$ and $N_{ports}^{CSI}$ respectively denote the number of aggregated CSI-RS resources and the number of antenna ports per aggregated CSI-RS resource configuration. The values of $N_{res}^{CSI}$ and $N_{ports}^{CSI}$ for the cases of 24 and 32 port NZP CSI-RS design are given in Table 8.

TABLE 8

Aggregation of CSI-RS configurations for 24 and 32 ports

| Total number of antenna ports $N_{res}^{CSI}N_{ports}^{CSI}$ | Number of antenna ports per CSI-RS configuration $N_{ports}^{CSI}$ | Number of CSI-RS configurations $N_{res}^{CSI}$ |
|---|---|---|
| 24 | 8 | 3 |
| 32 | 8 | 4 |

A solution by using 32 ports as an example is discussed, where a UE is signaled with a list of four 8 ports CSI-RS resources, i.e. $\{k_0, k_1, k_2, k_3\}$ and $k_i \in \{0,1,2,3,4\}$ is one of the 8 ports CSI-RS resource configurations in Table 2. For the case of OCC8, i.e., when higher layer parameter 'cdm-Type' is set to cdm8, and a list of $N_{res}^{CSI}=4$ CSI-RS resource configurations $\{k_0, k_1, k_2, k_3\}$, the list is reordered to a new list $\{m_0, m_1, m_2, m_3\}$ such that $m_0=k_0$ and $m_1$ corresponds to the first entry in $\{k_1, k_2, k_3\}$ that the pair of CSI-RS resources $\{m_0, m_1\}$ meet the constraints discussed in Embodiment A Similarly, $\{m_2, m_3\}$ are the second pair of CSI-RS resources with $m_3=k_i$ and $m_4=k_j$ (i,j∈{1,2,3}) such that j>i;

The mapping of the reference signal sequence $r_{l,n_s}(m)$ of Equation 5 to the complex-valued modulation symbols $a_{k,l}^{(p)}$ used as reference symbols on antenna port p are defined as:

$$a_{k,l}^{(p')} = w_{p'}(i) \cdot r_{l,n_s}(m')$$

where $$k = k'_q + 12m + \begin{cases} k'' & \text{for } p' \in \{15, \ldots, 22\}, \text{ normal cyclic prefix, } N_{ports}^{CSI} = 8 \\ k'' + 6 & \text{for } p' \in \{23, \ldots, 30\}, \text{ normal cyclic prefix, } N_{ports}^{CSI} = 8 \end{cases}$$

$$l = l'_q + \begin{cases} l'' & \text{CSI reference signal configurations } 0-19, \text{ normal cyclic prefix} \\ 2l'' & \text{CSI reference signal configurations } 20-31, \text{ normal cyclic prefix} \end{cases}$$

$$q = 0, 1$$

$$l'' = 0, 1$$

$$k'' = 0, 1$$

$$i = 4q + 2k'' + l''$$

$$m$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

and where $w_{p'}(i)$ is given by Table 9.

TABLE 9

| p' | [$w_{p'}(0)$ $w_{p'}(1)$ $w_{p'}(2)$ $w_{p'}(3)$ $w_{p'}(4)$ $w_{p'}(5)$ $w_{p'}(6)$ $w_{p'}(7)$] |
|---|---|
| 15, 23 | [1  1  1  1  1  1  1  1] |
| 16, 24 | [1 −1  1 −1  1 −1  1 −1] |
| 19, 25 | [1  1 −1 −1  1  1 −1 −1] |
| 20, 26 | [1 −1 −1  1  1 −1 −1  1] |
| 15, 27 | [1  1  1  1 −1 −1 −1 −1] |
| 16, 28 | [1 −1  1 −1 −1  1 −1  1] |
| 19, 29 | [1  1 −1 −1 −1 −1  1  1] |
| 20, 30 | [1 −1 −1  1 −1  1  1 −1] |

The quantity $(k_q', l_q')$ corresponds to (k', l') given in Table 2 of a CSI-RS resource configuration $n_q$ (q=0,1) and $\{n_0, n_1\}$ is a pair of CSI-RS configurations used for CDM8. $(n_0, n_1)=(m_0, m_1)$ or $(n_0, n_1)=(m_2, m_3)$. The quantity (k', l') and the necessary conditions on $n_s$ are given by Table 2. Let i be the ith pair of CSI-RS resources, i.e. $(m_{2i}, m_{2i+1})$, the relation between the antenna port number p and the quantity P can be described as $$p = i2N_{ports}^{CSI} + p' \qquad \text{Equation 14}$$

where p'∈ {15, 16, . . . 15+2$N_{ports}^{CSI}$−1} for the ith pair of CSI-RS resources $(m_{2i}, m_{2i+i})$ and i∈ {0,1}, $N_{ports}^{CSI}=8$.

Figure 21:
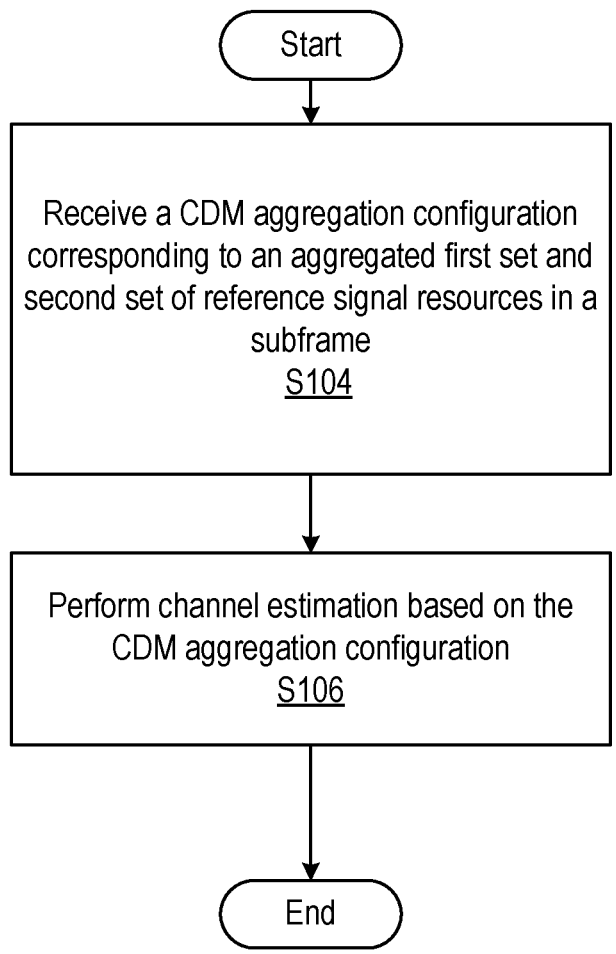
FIG. 21 is a flow diagram of one exemplary embodiment of the channel process of channel code 24 in accordance with the principles of the disclosure.

FIG. 21 is a flow diagram of one exemplary embodiment of the channel process of channel code 24 in accordance with the principles of the disclosure. Processing circuitry 18 receives a CDM aggregation configuration corresponding to an aggregated first set and second set of reference signal resources in a subframe, the first set and second set of reference signal resources satisfying a temporal criterion and a frequency criterion for separation between resource elements (Block S104). The selected first set and second set of reference signal resources in the subframe configured to reduce performance losses due to at least one channel variation across a plurality of symbols in the subframe. Processing circuitry 18 performs channel estimation based on the CDM aggregation configuration (Block S106).

Figure 22:
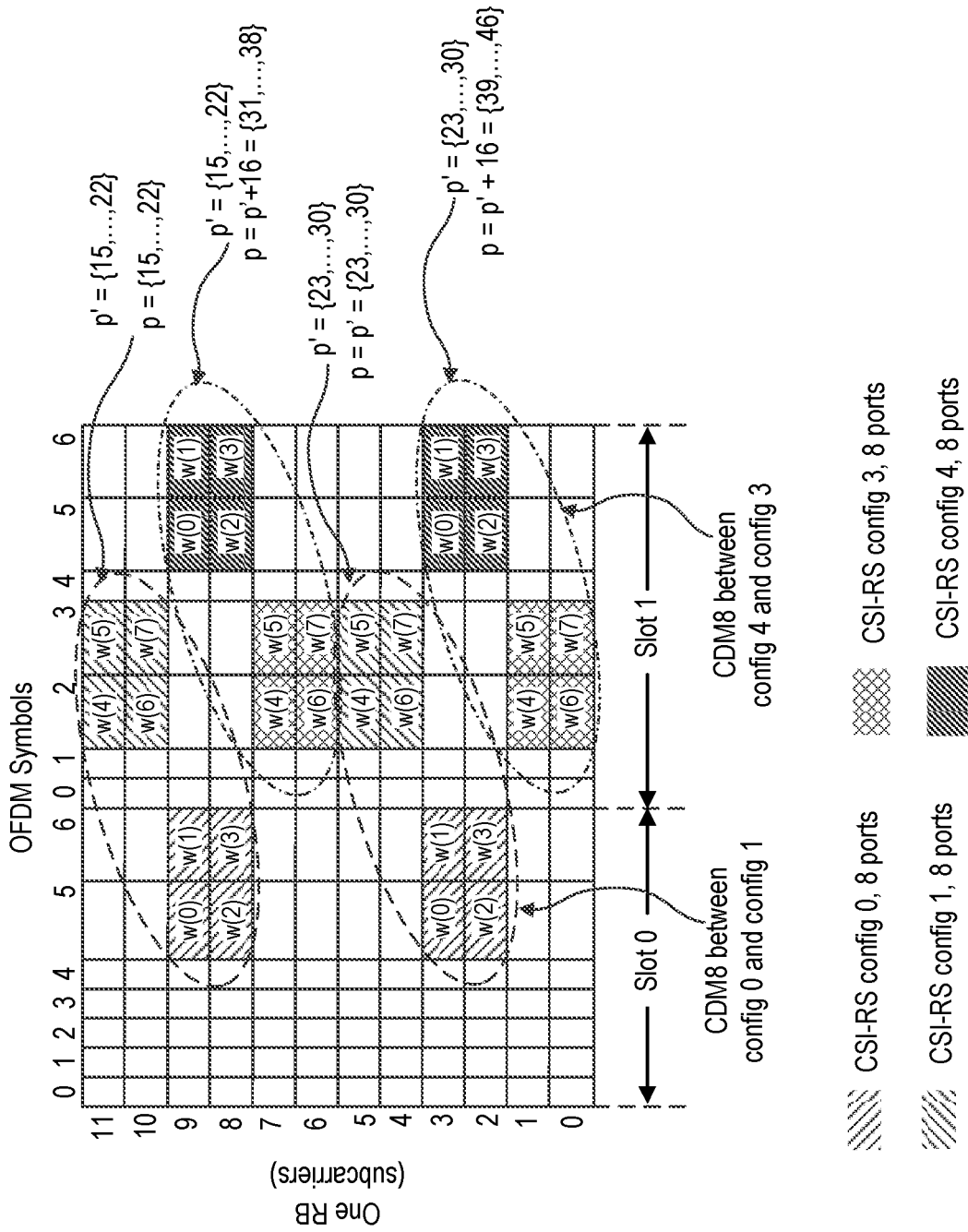
FIG. 22 is an example of antenna port numbering with CDM8 and 32 ports with $\{k\_0, k\_1, k\_2, k\_3\} = \{0, 4, 1, 3\}$.

FIG. 22 shows an example of antenna port numbering with CDM8 and 32 ports with $\{k_0, k_1, k_2, k_3\}=\{0, 4, 1, 3\}$. To satisfy the constraints discussed in Embodiment A, the CSI-RS resource configurations are re-ordered as $\{m_0, m_1, m_2, m_3\}=\{0,1, 4, 3\}$. Then the first CSI-RS resource pair is $\{n_0, n_1\}=(0,1)$ and the second pair is $\{n_0, n_1\}=(4,3)$. For the first pair of resources $\{n_0, n_1\}=(0,1)$, the CDM8 cover code $w_{p'}(0), \ldots, w_{p'}(3)$ are mapped to the CSI-RS REs of config 0 while $w_{p'}(4), \ldots, w_{p'}(7)$ are mapped to the CSI-RS REs of config 1. Similarly, for the second pair of resources $\{n_0, n_1\}=(4,3)$, the CDM8 cover code $w_{p'}(0), \ldots w_{p'}(3)$ are mapped to the CSI-RS REs of config 4 while $w_{p'}(4), \ldots, w_{p'}(7)$ are mapped to the CSI-RS REs of config 3. Note that the subscription p' of $w'_p$ is omitted in the figure for simplicity. The antenna port p can be derived according to $\{m_0, m_1, m_2, m_3\}=\{0,1, 4, 3\}$ and, where the first 16 ports p=$\{15, \ldots, 30\}$ are mapped to REs associated with the first CSI-RS resource pair $\{m_0, m_1\}=\{0,1\}$ and the next 16 ports p=$\{31, \ldots, 46\}$ are mapped to REs associated with the second CSI-RS resource pair $\{m_2, m_3\}=\{4,3\}$.

In one or more embodiments, network node 14 includes aggregation processing module. Aggregation processing module is configured to select a first set and second set of reference signal resources in a subframe. The aggregation processing module is further configured to aggregate the first set and second set of reference signal resources to the subframe to form a code division multiplexing, CDM, aggregation configuration. The first set and second set of reference signal resources in the subframe satisfy a temporal criterion such that any two resource elements in the first set and second set of reference signal resources have up to a maximum time separation of six OFDM symbols. The first set and second set of reference signal resources in the subframe satisfy a frequency criterion such that any two resource elements in the first set and second set of reference signal resources have up to a maximum frequency separation of six subcarriers.

In one or more embodiments, a wireless device 14 includes a channel processing module configured to receive a CDM aggregation configuration corresponding to an aggregated first set and second set of reference signal resources in a subframe. The CDM aggregation configuration configured to perform channel estimation based on the CDM aggregation configuration. The first set and second set of reference signal resources in the subframe satisfy a temporal criterion such that any two resource elements in the first set and second set of reference signal resources have up to a maximum time separation of six OFDM symbols. The first set and second set of reference signal resources in the subframe satisfy a frequency criterion such that any two resource elements in the first set and second set of reference signal resources have up to a maximum frequency separation of six subcarriers.

Some embodiments include:

Embodiment 1A. A network node 14, comprising:
processing circuitry 28 configured to:
select a first set and second set of reference signal resources in a subframe to reduce performance losses due to at least one channel variation across a plurality of symbols in the subframe; and
communicate the selected first set and second set of reference signal resources to a wireless device.

Embodiment 2A. The network node 14 of Embodiment 1A, wherein the at least one channel variation across the plurality of symbols in the subframe includes a channel variation in time.

Embodiment 3A. The network node 14 of any of Embodiments 1A-2A, wherein the selection of the first set and second set of reference signal resources in the subframe satisfies a temporal criterion, the temporal criterion defining a maximum time separation between any two symbols of the plurality of symbols to be six symbols.

Embodiment 4A. The network node 14 of any of Embodiments 1A-3A, wherein the at least one channel variation across symbols includes a channel variation in the frequency domain.

Embodiment 5A. The network node of any of Embodiments 1A-4A, wherein the selection of the first set and second set of reference signal resources in the subframe satisfies a frequency criterion, the frequency criterion defining a maximum frequency separation between any two subcarriers carrying the plurality of symbols to be six subcarriers.

Embodiment 6A. The network node 14 of any one of Embodiments 1A-5A, wherein the first set of reference signal resources corresponds to a first reference signal configuration including a first portion of the reference signal resources;
the second set of reference signal resources corresponds to a second portion of reference signal resources different from the first portion of reference signal resources.

Embodiment 7A. The network node 14 of Embodiment 6A, wherein the first reference signal configuration is at least a first channel state information-reference signal, CSI-RS, configuration; and
the second reference signal configuration is at least a second CSI-RS configuration different from the at least first CSI-RS configuration.

Embodiment 8A. The network node 14 of any of Embodiments 1A-7A, wherein the first set and second set of reference signal resources in the subframe are aggregated to form a code division multiplexing, CDM, aggregation configuration.

Embodiment 9A. The network node of Embodiment 8A, wherein the first set of reference signal resources in the subframe includes a subset of resource from an eight port CSI-RS resource;
the second set of reference signal resources in the subframe includes a subset of resources in a different eight port CSI-RS resource from the eight port CSI-RS resource in the first set of reference signal resources; and
the CDM aggregation configuration having an orthogonal code cover of length eight.

Embodiment 10A. A method, comprising:
selecting a first set and second set of reference signal resources in a subframe to reduce performance losses due to at least one channel variation across a plurality of symbols in the subframe; and
communicating the selected first set and second set of reference signal resources to a wireless device 12.

Embodiment 11A. The method of Embodiment 10A, wherein the at least one channel variation across the plurality of symbols in the subframe includes a channel variation in time.

Embodiment 12A. The method of any of Embodiments 10A-11A, wherein the selection of the first set and second set of reference signal resources in the subframe satisfies a temporal criterion, the temporal criterion defining a maximum time separation between any two symbols of the plurality of symbols to be six symbols.

Embodiment 13A. The method of any of Embodiments 10A-12A, wherein the at least one channel variation across symbols includes a channel variation in the frequency domain.

Embodiment 14A. The method of any of Embodiments 10A-13A, wherein the selection of the first set and second set of reference signal resources in the subframe satisfies a frequency criterion, the frequency criterion defining a maximum frequency separation between any two carriers carrying the plurality of symbols to be six subcarriers.

Embodiment 15A. The method of any one of Embodiments 10A-14A, wherein the first set of reference signal resources corresponds to a first reference signal configuration including a first portion of the reference signal resources;

the second set of reference signal resources corresponds to a second portion of reference signal resources different from the first portion of reference signal resources.

Embodiment 16A. The method of Embodiment 15A, wherein the first reference signal configuration is at least a first channel state information-reference signal, CSI-RS, configuration; and the second reference signal configuration is at least a second CSI-RS configuration different from the at least first CSI-RS configuration.

Embodiment 17A. The method of any of Embodiments 10A-16A, wherein the first set and second set of reference signal resources in the subframe are aggregated to form a code division multiplexing, CDM, aggregation configuration.

Embodiment 18A. The method of Embodiment 17A, wherein the first set of reference signal resources in the subframe includes a subset of resources within an eight port CSI-RS resource;

the second set of reference signal resources in the subframe includes a subset of resources within a different eight port CSI-RS resource from the eight port CSI-RS resource in the first set of reference signal resources; and the CDM aggregation configuration having an orthogonal code cover of length eight.

Embodiment 19A. A wireless device 12, comprising:
processing circuitry 18 configured to:
receive an indication of a selected first set and second set of reference signal resources in a subframe, the selected first set and second set of reference signal resources in the subframe configured to reduce performance losses due to at least one channel variation across a plurality of symbols in the subframe;
perform channel estimation based on the selected first set and second set of reference signal resources in the subframe.

Embodiment 20A. The wireless device 12 of Embodiment 19A, wherein the at least one channel variation across the plurality of symbols in the subframe includes a channel variation in time.

Embodiment 21A. The wireless device 12 of any of Embodiments 19A-20A, wherein the first set and second set of reference signal resources in the subframe satisfies a temporal criterion, the temporal criterion defining a maximum time separation between any two symbols of the plurality of symbols to be six symbols.

Embodiment 22A. The wireless device 12 of any of Embodiments 19A-21A, wherein the at least one channel variation across symbols includes a channel variation in the frequency domain.

Embodiment 23A. The wireless device 12 of any of Embodiments 19A-22A, wherein the first set and second set of reference signal resources in the subframe satisfies a frequency criterion, the frequency criterion defining a maximum frequency separation between any two carriers carrying the plurality of symbols to be six subcarriers.

Embodiment 24A. The wireless device 12 of any one of Embodiments 19A-23A, wherein the first set of reference signal resources corresponds to a first reference signal configuration including a first portion of the reference signal resources;

the second set of reference signal resources corresponds to a second portion of reference signal resources different from the first portion of reference signal resources.

Embodiment 25A. The wireless device 12 of Embodiment 24A, wherein the first reference signal configuration is at least a first channel state information-reference signal, CSI-RS, configuration; and the second reference signal configuration is at least a second CSI-RS configuration different from the at least first CSI-RS configuration.

Embodiment 26A. The wireless device 12 of any of Embodiments 19A-25A, wherein the first set and second set of reference signal resources in the subframe are aggregated to form a code division multiplexing, CDM, aggregation configuration.

Embodiment 27A. The wireless device 12 of Embodiment 26A, wherein the first set of reference signal resources in the subframe includes a subset of resources within an eight port CSI-RS resource;

the second set of reference signal resources in the subframe includes a subset of resources within a different eight port CSI-RS resource from the eight port CSI-RS resources in the first set of reference signal resources; and the CDM aggregation configuration having an orthogonal code cover of length eight.

Embodiment 28A. The wireless device 12 of any of Embodiments 19A-27A, wherein the processing circuitry 18 is further configured to map the selected first set and second set of reference signal resources in the subframe to a plurality of antenna ports.

Embodiment 29A. A method, comprising:
receiving an indication of a selected first set and second set of reference signal resources in a subframe, the selected first set and second set of reference signal resources in the subframe configured to reduce performance losses due to at least one channel variation across a plurality of symbols in the subframe;
performing channel estimation based on the selected first set and second set of reference signal resources in the subframe.

Embodiment 30A. The method of Embodiment 29A, wherein the at least one channel variation across the plurality of symbols in the subframe includes a channel variation in time.

Embodiment 31A. The method of any of Embodiments 29A-30A, wherein the first set and second set of reference signal resources in the subframe satisfies a temporal criterion, the temporal criterion defining a maximum time separation between any two symbols of the plurality of symbols to be six symbols.

Embodiment 32A. The method of any of Embodiments 29A-31A, wherein the at least one channel variation across symbols includes a channel variation in the frequency domain.

Embodiment 33A. The method of any of Embodiments 29A-32A, wherein the first set and second set of reference signal resources in the subframe satisfies a frequency criterion, the frequency criterion defining a maximum frequency separation between any two subcarriers carrying the plurality of symbols to be six subcarriers.

Embodiment 34A. The method of any one of Embodiments 29A-33A, wherein the first set of reference signal resources corresponds to a first reference signal configuration including a first portion of the reference signal resources;

the second set of reference signal resources corresponds to a second portion of reference signal resources different from the first portion of reference signal resources.

Embodiment 35A. The method of Embodiment 34A, wherein the first reference signal configuration is at least a first channel state information-reference signal, CSI-RS, configuration; and the second reference signal configuration is at least a second CSI-RS configuration different from the at least first CSI-RS configuration.

Embodiment 36A. The method of any of Embodiments 29A-35A, wherein the first set and second set of reference signal resources in the subframe are aggregated to form a code division multiplexing, CDM, aggregation configuration.

Embodiment 37A. The method of Embodiment 36A, wherein the first set of reference signal resources in the subframe includes a subset of resources within an eight port CSI-RS resource;

the second set of reference signal resources in the subframe includes a subset of resources within a different eight port CSI-RS resource from the eight port CSI-RS resource in the first set of reference signal resources; and the CDM aggregation configuration having an orthogonal code cover of length eight.

Embodiment 38A. The method of any of Embodiments 29A-37A, wherein the processing circuitry is further configured to map the selected first set and second set of reference signal resources in the subframe to a plurality of antenna ports.

Embodiment 39A. A network node 14, comprising:
an aggregation processing module configured to:
select a first set and second set of reference signal resources in a subframe to reduce performance losses due to at least one channel variation across a plurality of symbols in the subframe; and
communicate the selected first set and second set of reference signal resources to a wireless device 12.

Embodiment 40A. A wireless device 12, comprising:
channel processing module configured to:
receive an indication of a selected first set and second set of reference signal resources in a subframe, the selected first set and second set of reference signal resources in the subframe configured to reduce performance losses due to at least one channel variation across a plurality of symbols in the subframe;
perform channel estimation based on the selected first set and second set of reference signal resources in the subframe.

Some Other Embodiments

According to one aspect of the disclosure, a network node 14 is provided. The network node includes processing circuitry 18 configured to: select a first set and second set of reference signal resources in a subframe and aggregate the first set and second set of reference signal resources in the subframe to form a code division multiplexing, CDM, aggregation configuration. The first set and second set of reference signal resources in the subframe satisfy a temporal criterion such that any two resource elements in the first set and second set of reference signal resources have up to a maximum time separation of six OFDM symbols. The first set and second set of reference signal resources in the subframe satisfy a frequency criterion such that any two resource elements in the first set and second set of reference signal resources have up to a maximum frequency separation of six subcarriers.

According to one embodiment of this aspect, the first set of reference signal resources corresponds to a first portion of a first reference signal configuration. The second set of reference signal resources corresponds to a second portion of a second reference signal configuration. According to one embodiment of this aspect, the first reference signal configuration is at least a first channel state information-reference signal, CSI-RS, configuration. The second reference signal configuration is at least a second CSI-RS configuration different from the at least first CSI-RS configuration.

According to one embodiment of this aspect, the first set of reference signal resources in the subframe includes a subset of resources from an eight port CSI-RS resource configuration. The second set of reference signal resources in the subframe includes a subset of resources in a different eight port CSI-RS resource configuration different from the eight port CSI-RS resource configuration corresponding to the first set of reference signal resources. The CDM aggregation configuration has an orthogonal cover code of length eight. According to one embodiment of this aspect, the processing circuitry 28 is further configured to communicate the CDM aggregation configuration to a wireless device 12. According to one embodiment of this aspect, the CDM aggregation configuration is an aggregation of two CDM-4 groups.

According to another aspect of the disclosure, a method is provided. A first set and second set of reference signal resources in a subframe are selected. The first set and second set of reference signal resources are aggregated to the subframe to form a code division multiplexing, CDM, aggregation configuration. The first set and second set of reference signal resources in the subframe satisfy a temporal criterion such that any two resource elements in the first set and second set of reference signal resources have up to a maximum time separation of six OFDM symbols. The first set and second set of reference signal resources in the subframe satisfy a frequency criterion such that any two resource elements in the first set and second set of reference signal resources have up to a maximum frequency separation of six subcarriers.

According to one embodiment of this aspect, the first set of reference signal resources corresponds to a first portion of a first reference signal configuration. The second set of reference signal resources corresponds to a second portion of a second reference signal configuration. According to one embodiment of this aspect, the first reference signal configuration is at least a first channel state information-reference signal, CSI-RS, configuration. The second reference signal configuration is at least a second CSI-RS configuration different from the at least first CSI-RS configuration. According to one embodiment of this aspect, the first set of reference signal resources in the subframe includes a subset of resources from an eight port CSI-RS resource configuration. The second set of reference signal resources in the subframe includes a subset of resources in a different eight port CSI-RS resource configuration different from the eight port CSI-RS resource configuration corresponding to the first set of reference signal resources. The CDM aggregation configuration having an orthogonal cover code of length eight.

According to one embodiment of this aspect, the CDM aggregation configuration is communicated to a wireless device 12. According to one embodiment of this aspect, the CDM aggregation configuration is an aggregation of two CDM-4 groups.

According to another aspect of the disclosure, a wireless device 12 is provided. The wireless device includes processing circuitry 28 configured to receive a CDM aggregation configuration corresponding to an aggregated first set and second set of reference signal resources in a subframe and perform channel estimation based on the CDM aggregation configuration. The first set and second set of reference signal resources satisfy a temporal criterion such that any two resource elements in the first set and second set of reference signal resources have up to a maximum time separation of six OFDM symbols. The first set and second set of reference signal resources satisfy a frequency criterion such that any two resource elements in the first set and second set of reference signal resources have up to a maximum frequency separation of six subcarriers.

According to one embodiment of this aspect, the first set of reference signal resources corresponds to a first portion of a first reference signal configuration. The second set of reference signal resources corresponds to a second portion of a second reference signal configuration. According to one embodiment of this aspect, the first reference signal configuration is at least a first channel state information-reference signal, CSI-RS, configuration. The second reference signal configuration is at least a second CSI-RS configuration different from the at least first CSI-RS configuration.

According to one embodiment of this aspect, the first set of reference signal resources in the subframe includes a subset of resources from an eight port CSI-RS resource configuration. The second set of reference signal resources in the subframe includes a subset of resources in a different eight port CSI-RS resource configuration different from the eight port CSI-RS resource configuration corresponding to the first set of reference signal resources. The CDM aggregation configuration having an orthogonal cover code of length eight. According to one embodiment of this aspect, the processing circuitry 28 is further configured to map the selected first set and second set of reference signal resources in the subframe to a plurality of antenna ports. According to one embodiment of this aspect, the CDM aggregation configuration is an aggregation of two CDM-4 groups.

According to another aspect of the disclosure, a method for a wireless device 12 is provided. A CDM aggregation configuration corresponding to an aggregated first set and second set of reference signal resources in a subframe is received. The first set and second set of reference signal resources. Channel estimation is performed based on the CDM aggregation configuration. The first set and second set of reference signal resources satisfy a temporal criterion such that any two resource elements in the first set and second set of reference signal resources have up to a maximum time separation of six OFDM symbols. The first set and second set of reference signal resources satisfy a frequency criterion such that any two resource elements in the first set and second set of reference signal resources have up to a maximum frequency separation of six subcarriers.

According to one embodiment of this aspect, the first set of reference signal resources corresponds to a first portion of a first reference signal configuration. The second set of reference signal resources corresponds to a second portion of a second reference signal configuration. According to one embodiment of this aspect, the first reference signal configuration is at least a first channel state information-reference signal, CSI-RS, configuration. The second reference signal configuration is at least a second CSI-RS configuration different from the at least first CSI-RS configuration.

According to one embodiment of this aspect, the first set of reference signal resources in the subframe includes a subset of resources from an eight port CSI-RS resource configuration. The second set of reference signal resources in the subframe includes a subset of resources in a different eight port CSI-RS resource configuration different from the eight port CSI-RS resource configuration corresponding to the first set of reference signal resources. The CDM aggregation configuration has an orthogonal cover code of length eight.

According to one embodiment of this aspect, the CDM aggregation configuration is an aggregation of two CDM-4 groups. According to one embodiment of this aspect, the selected first set and second set of reference signal resources in the subframe are mapped to a plurality of antenna ports.

According to another aspect of the disclosure, a network node 14 is provided. The network node 14 includes an aggregation processing module configured to: select a first set and second set of reference signal resources in a subframe and aggregate the first set and second set of reference signal resources to the subframe to form a code division multiplexing, CDM, aggregation configuration. The first set and second set of reference signal resources in the subframe satisfy a temporal criterion such that any two resource elements in the first set and second set of reference signal resources have up to a maximum time separation of six OFDM symbols. The first set and second set of reference signal resources in the subframe satisfy a frequency criterion such that any two resource elements in the first set and second set of reference signal resources have up to a maximum frequency separation of six subcarriers.

According to one aspect of the disclosure, a wireless device 12 is provided. The wireless device 12 includes a channel processing module configured to: receive a CDM aggregation configuration corresponding to an aggregated first set and second set of reference signal resources in a subframe, and perform channel estimation based on the CDM aggregation configuration. The first set and second set of reference signal resources satisfy a temporal criterion such that any two resource elements in the first set and second set of reference signal resources have up to a maximum time separation of six OFDM symbols. The first set and second set of reference signal resources satisfy a frequency criterion such that any two resource elements in the first set and second set of reference signal resources have up to a maximum frequency separation of six subcarriers.

According to one embodiment of this aspect, the channel processing module is further configured to communicate the CDM aggregation configuration to a wireless device. According to one embodiment of this aspect, the CDM aggregation configuration is communicated to a wireless device 12.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings which are limited only by the following claims.

What is claimed is:

1. A wireless device, comprising:
processing circuitry configured to:
receive a code division multiplexing, CDM, aggregation configuration for a CDM-8 design for a plurality of CSI-RS, Channel System Information-Reference Signal, antenna ports, the CDM aggregation configuration corresponding to an aggregated first set and second set of reference signal resources in a subframe, the CDM aggregation configuration being an aggregation of two CDM-4 orthogonal cover codes, the two CDM-4 orthogonal cover codes being selected from a constrained set of pairs that are selected to minimize loss of orthogonality of a length 8 cover code;
perform channel estimation based on the CDM aggregation configuration;
the first set and second set of reference signal resources satisfying a temporal criterion such that any two resource elements in the first set and second set of reference signal resources have up to a maximum time separation of six OFDM symbols; and
the first set and second set of reference signal resources satisfy a frequency criterion such that any two resource elements in the first set and second set of reference signal resources have up to a maximum frequency separation of six subcarriers.

2. The wireless device of claim 1, wherein the first set of reference signal resources corresponds to a first portion of a first reference signal configuration; and
the second set of reference signal resources corresponds to a second portion of a second reference signal configuration.

3. The wireless device of claim 2, wherein the first reference signal configuration is at least a first channel state information-reference signal, CSI-RS, configuration; and
the second reference signal configuration is at least a second CSI-RS configuration that is different from the at least first CSI-RS configuration.

4. The wireless device of claim 3, wherein the first set of reference signal resources in the subframe includes a subset of resources from an eight port CSI-RS resource configuration;
the second set of reference signal resources in the subframe includes a subset of resources in a different eight port CSI-RS resource configuration different from the eight port CSI-RS resource configuration corresponding to the first set of reference signal resources; and
the CDM aggregation configuration has an orthogonal cover code of length eight.

5. The wireless device of claim 1, wherein the first set of reference signal resources in the subframe includes a subset of resources from an eight port CSI-RS resource configuration;
the second set of reference signal resources in the subframe includes a subset of resources in a different eight port CSI-RS resource configuration different from the eight port CSI-RS resource configuration corresponding to the first set of reference signal resources; and
the CDM aggregation configuration having an orthogonal cover code of length eight.

6. The wireless device of claim 5, wherein the processing circuitry is further configured to map the selected first set and second set of reference signal resources in the subframe to a plurality of antenna ports.

7. The wireless device of claim 1, wherein the processing circuitry is further configured to map the selected first set and second set of reference signal resources in the subframe to a plurality of antenna ports.

8. The wireless device of claim 1, wherein there are at least 24 CSI-RS, antenna ports.

9. A method for a wireless device, the method comprising:
receiving a code division multiplexing, CDM, aggregation configuration for a CDM-8 design for a plurality of CSI-RS, Channel System Information-Reference Signal, antenna ports, the CDM aggregation configuration corresponding to an aggregated first set and second set of reference signal resources in a subframe, the first set and second set of reference signal resources, the CDM aggregation configuration being an aggregation of two CDM-4 orthogonal cover codes, the two CDM-4 orthogonal cover codes being selected from a constrained set of pairs that are selected to minimize loss of orthogonality of a length 8 cover code;
performing channel estimation based on the CDM aggregation configuration;
the first set and second set of reference signal resources satisfying a temporal criterion such that any two resource elements in the first set and second set of reference signal resources have up to a maximum time separation of six OFDM symbols; and
the first set and second set of reference signal resources satisfying a frequency criterion such that any two resource elements in the first set and second set of reference signal resources have up to a maximum frequency separation of six subcarriers.

10. The method of claim 9, wherein the first set of reference signal resources corresponds to a first portion of a first reference signal configuration; and
the second set of reference signal resources corresponds to a second portion of a second reference signal configuration.

11. The method of claim 10, wherein the first reference signal configuration is at least a first channel state information-reference signal, CSI-RS, configuration; and
the second reference signal configuration is at least a second CSI-RS configuration that is different from the at least first CSI-RS configuration.

12. The method of claim 11, wherein the first set of reference signal resources in the subframe includes a subset of resources from an eight port CSI-RS resource configuration;
the second set of reference signal resources in the subframe includes a subset of resources in a different eight port CSI-RS resource configuration different from the eight port CSI-RS resource configuration corresponding to the first set of reference signal resources; and
the CDM aggregation configuration has an orthogonal cover code of length eight.

13. The method of claim 9, wherein the first set of reference signal resources in the subframe includes a subset of resources from an eight port CSI-RS resource configuration;
the second set of reference signal resources in the subframe includes a subset of resources in a different eight port CSI-RS resource configuration different from the eight port CSI-RS resource configuration corresponding to the first set of reference signal resources; and
the CDM aggregation configuration having an orthogonal cover code of length eight.

14. The method of claim 13, further comprising mapping the selected first set and second set of reference signal resources in the subframe to a plurality of antenna ports.

15. The method of claim 9, further comprising mapping the selected first set and second set of reference signal resources in the subframe to a plurality of antenna ports.

16. The wireless device of claim 9, wherein there are at least 24 CSI-RS, antenna ports.

* * * * *